United States Patent
Zhao et al.

(10) Patent No.: US 12,534,445 B2
(45) Date of Patent: Jan. 27, 2026

(54) METHOD FOR PREPARING PROPYLENE OXIDE BY MEANS OF DIRECT EPOXIDATION OF PROPYLENE

(71) Applicants: CHINA PETROLEUM & CHEMICAL CORPORATION, Beijing (CN); SINOPEC RESEARCH INSTITUTE OF SAFETY ENGINEERING CO., LTD., Shandong (CN)

(72) Inventors: Chenyang Zhao, Shandong (CN); Bing Sun, Shandong (CN); Hongwei Zhu, Shandong (CN); Junjie Feng, Shandong (CN); Lin Wang, Shandong (CN); Zhe Yang, Shandong (CN); Wei Xu, Shandong (CN); Huiyun Jiang, Shandong (CN); Fei An, Shandong (CN); Yan Jin, Shandong (CN)

(73) Assignees: CHINA PETROLEUM & CHEMICAL CORPORATION, Beijing (CN); SINOPEC RESEARCH INSTITUTE OF SAFETY ENGINEERING CO., LTD., Shandong (CN)

( * ) Notice: Subject to any disclaimer, the term of this patent is extended or adjusted under 35 U.S.C. 154(b) by 518 days.

(21) Appl. No.: 18/005,001

(22) PCT Filed: Jan. 26, 2021

(86) PCT No.: PCT/CN2021/073750
§ 371 (c)(1),
(2) Date: Jan. 10, 2023

(87) PCT Pub. No.: WO2022/007388
PCT Pub. Date: Jan. 13, 2022

(65) Prior Publication Data
US 2023/0339875 A1 Oct. 26, 2023

(30) Foreign Application Priority Data

Jul. 10, 2020 (CN) .......................... 202010663791.1
Jul. 10, 2020 (CN) .......................... 202010663795.X

(51) Int. Cl.
*C07D 301/10* (2006.01)

(52) U.S. Cl.
CPC ................................. *C07D 301/10* (2013.01)

(58) Field of Classification Search
CPC ... C07D 301/10; C07D 301/08; C07D 303/04
(Continued)

(56) References Cited

U.S. PATENT DOCUMENTS

2009/0247773 A1 10/2009 Chang et al.
2012/0296102 A1 11/2012 Kawabata et al.

FOREIGN PATENT DOCUMENTS

CN  1223644 A  7/1999
CN  1268072 A  9/2000
(Continued)

OTHER PUBLICATIONS

Yuan et al , Propylene epoxidation in a microreactor with electric heating, Catalysis Today 105 (2005) 544-550 (Year: 2005).*

*Primary Examiner* — Taylor V Oh
(74) *Attorney, Agent, or Firm* — NKL Law; Allen Xue

(57) ABSTRACT

A method of preparing epoxypropane by direct epoxidation of propylene includes the steps of contacting a mixed gas consisting of a reaction feed gas and a diluent gas with a catalyst to carry out reaction under reaction conditions of propylene epoxidation to prepare epoxypropane. The reaction feed gas contains propylene, oxygen gas and hydrogen gas while at least a portion of the diluent gas is a gaseous olefin. Using gaseous olefin as at least a portion of the diluent gas to perform propylene epoxidation can significantly extend service life of the catalyst, effectively reduce (Continued)

the used amount of diluent gas, and improve the reaction selectivity and propylene conversion rate.

18 Claims, 3 Drawing Sheets

(58) Field of Classification Search
USPC .......................................................... 549/533
See application file for complete search history.

(56) References Cited

FOREIGN PATENT DOCUMENTS

| | | | |
|---|---|---|---|
| CN | 1297443 | A | 5/2001 |
| CN | 1330644 | A | 1/2002 |
| CN | 107216296 | A | 9/2017 |
| JP | H10244156 | A | 9/1998 |

\* cited by examiner

METHOD FOR PREPARING PROPYLENE OXIDE BY MEANS OF DIRECT EPOXIDATION OF PROPYLENE

CROSS REFERENCE TO RELATED APPLICATIONS

This application is a U.S. national stage entry of PCT international application no. PCT/CN2021/073750, filed on Jan. 26, 2021, which claims priority to the Chinese patent application No. 202010663795.X, filed on Jul. 10, 2020, entitled "METHOD FOR DIRECT EXPDXIDATION OF PROPYLENE WITH REDUCED DOSAGE OF DILUENT GAS", and the Chinese patent application No. 202010663791.1, filed on Jul. 10, 2020, entitled "METHOD FOR PREPARING EPDXYPROPANE BY DIRECT EXPDXIDATION OF PROPYLENE UNDER ALKALINE CONDITIONS", the content of each is incorporated herein by reference in its entirety.

TECHNICAL FIELD

The present disclosure relates to the technical field of preparing epoxypropane, in particular to a method for preparing epoxypropane by direct epoxidation of propylene.

BACKGROUND ART

Epoxypropane, also known as propylene oxide or methyl ethylene oxide, is an important raw material for producing organic compounds, is the third largest propylene-based derivative following the polypropylene and acrylonitrile. Epoxypropane is a colorless, ether-flavored liquid with a low boiling point, flammable property and chirality. The industrial products of epoxypropane are generally racemic mixtures of two enantiomers. The epoxypropane is partially miscible with water, and miscible with ethanol and ether, and can form binary azeotropes with pentane, pentene, cyclopentane, cyclopentene and methylene chloride.

The epoxypropane is mainly used for the production of polyether polyol, propylene glycol and various types of nonionic surfactants, wherein the polyether polyol is an important raw material for producing polyurethane foams, thermal insulation materials, elastomers, adhesives and coatings; the various types of nonionic surfactants are widely applied in the petroleum, chemical, pesticide, textile, daily use chemical and other industries. In addition, epoxypropane is also an important raw material for basic chemical industry.

The HPPO process is at present an industrially novel production method of epoxypropane, it is a direct oxidation method which uses titanium silicalite as a catalyst and hydrogen peroxide as an oxidizing agent. The HPPO process only produces epoxypropane and water, and has the advantages such as a high product selectivity, less by-products, a simple technological process without polluting the environment. However, the process has defects such as short service life of catalyst, high energy consumption, high dosage of solvent, low utilization rate of $H_2O_2$.

The method for preparing epoxypropane by direct oxidation of propylene has attracted increasing attentions from the researchers in recent years due to its high selectivity, simple reaction process and other advantages. The method can be used for producing epoxypropane by directly subjecting propylene to epoxidation with hydrogen gas and oxygen gas in the presence of a catalyst and a diluent gas $N_2$. The outstanding advantages of the reaction comprise the mild reaction conditions, high selectivity, and environmentally-friendly and clean production process. However, the process has obvious defects, for example: 1) in order to solve safety problems, a majority of the researchers choose to mingle a large amount of inert shielding gas (e.g., 70-95 vol. % nitrogen gas or argon gas) to avoid explosion of the system, but the excessive use of diluent gas significantly exacerbates the difficulty of subsequent product separation process, thereby increasing the energy consumption; 2) the method is characterized by a short service life of catalyst, which is typically less than 100 hours; 3) for the sake of solving the safety concern, the oxygen concentration during the reaction process is typically controlled to not more than 5 vol. %, but the reduced oxygen concentration results in a decreased concentration of the reactant gas, poor utilization rate of raw materials, and reduced reaction selectivity and propylene conversion rate.

SUMMARY OF THE INVENTION

The present disclosure aims to overcome the deficiencies of the prior art in the propylene epoxidation technologies with respect to the short service life of catalyst, high dosage of diluent gas, low oxygen concentration, low reaction selectivity and propylene conversion rate, and provides a method for preparing epoxypropane by direct epoxidation of propylene. The present disclosure uses gaseous olefin as at least a portion of the diluent gas to perform propylene epoxidation, can significantly extend service life of the catalyst, effectively reduce the used amount of diluent gas, so as to alleviate the difficulty of subsequent product separation process, reduce the energy consumption, and effectively increase the concentration of oxygen gas in the reaction system under the condition of ensuring safety, thereby increasing the concentration of the reactant gas, and improve the reaction selectivity and propylene conversion rate.

In order to achieve the above object, the present disclosure provides a method of performing direct epoxidation of propylene comprising: preparing epoxypropane by contacting a mixed gas consisting of a reaction feed gas and a diluent gas with a catalyst to carry out reaction under reaction conditions of propylene epoxidation, wherein the reaction feed gas comprising propylene, oxygen gas and hydrogen gas; at least a portion of the diluent gas is a gaseous olefin.

Preferably, the gaseous olefin is propylene.

Preferably, the propylene epoxidation is carried out in the presence of an alkaline substance.

Preferably, the alkali is used in an amount of 1-10,000 ppm.

Preferably, the propylene epoxidation is carried out in a microchannel reactor.

Preferably, the catalyst and the inert filler are filled in the reactor in an alternately layered stacking manner.

Preferably, the volumetric hourly space velocity of the propylene epoxidation is 500-30,000 $mL \cdot g_{cat}^{-1} \cdot h^{-1}$.

Preferably, the method further comprises a step of preheating the mixed gas prior to contacting the mixed gas with the catalyst.

Preferably, the method further comprises: blending a first feed gas and a second feed gas to obtain the mixed gas;

wherein the first feed gas contains oxygen gas and is free or substantially free of hydrogen gas, the second feed gas contains hydrogen gas and is free or substantially free of oxygen gas, the first feed gas and/or the second feed gas contain propylene, at least one of the first feed gas and the second feed gas further comprises a gaseous olefin.

Due to the aforementioned technical scheme, the present disclosure can produce the following favorable effects:

1. The present disclosure significantly extends the service life of catalyst by using gaseous olefin as at least a portion of diluent gas for direct epoxidation of propylene, as exemplified in a tubular reactor, the service life of catalyst can be extended from a conventional service life of 100 hours to over 500 hours, and can be further prolonged in a microchannel reactor.
2. The present disclosure effectively reduces the dosage of diluent gas by using gaseous olefin as at least a portion of diluent gas for direct epoxidation of propylene. For example, if the epoxidation is performed in a tubular reactor, an use of the technical scheme of the present disclosure can reduce the dosage of diluent gas to be 70 vol. % or less; if the epoxidation is performed in a microchannel reactor, the dosage of diluent gas can be further decreased, even to the near zero level. In addition, the reduced dosage of diluent gas can alleviate difficulties in subsequent product separation process and reduce energy consumption.
3. The combustion and explosion experiment with a detonation tube shows that as compared with using $N_2$ as the diluent gas, the system in a circumstance of using gaseous olefin as at least a portion of the diluent gas can tolerate higher upper limit of oxygen content, which may be more than 10 vol. %, and a wider range of operable scope of feed gas, thus the system can be safer without the combustion and explosion risk, further achieving the intrinsic safety of the reaction process.
4. The present disclosure uses gaseous olefin as at least a portion of diluent gas for direct epoxidation of propylene, can reduce the dosage of diluent gas, and hike the tolerable upper limit of oxygen content of the system, thereby increasing the concentration of reactant gases, improving the reaction selectivity and propylene conversion rate.
5. Gaseous olefins have a larger specific heat capacity than nitrogen gas, an use of gaseous olefin as at least a portion of the diluent gas can rapidly absorb the reaction heat released during the epoxidation process, thereby ensuring a safe and efficient operation of the direct epoxidation reaction with the gas phase of propylene.
6. When the gaseous olefin is preferably propylene, propylene acts as both diluent gas and reactant gas, it further increases the concentration of reactant gas, promotes forward direction progress of the target reaction, and improves the utilization rate of the two other feed gases ($H_2$, $O_2$).
7. Preferably, the reaction system is under an alkaline condition, which further reduces dosage of diluent gas and hikes the tolerable upper limit of oxygen content of the system; in addition, such a condition can improve the active center of the catalyst, alter the original reaction pathway, suppress occurrence of side reactions, and further improve the epoxypropane selectivity, propylene conversion rate, space-time yield, utilization rate of hydrogen gas, and prolong the service life of the catalyst.

DESCRIPTION OF THE PREFERRED EMBODIMENTS

Figure 1:
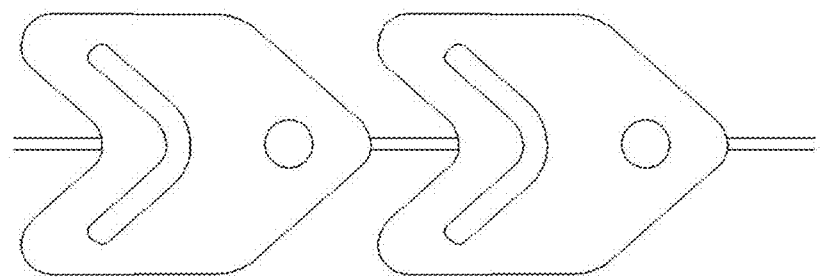
FIG. 1 illustrates a microchannel reactor with a heart-shaped structure used in the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a method of performing direct epoxidation of propylene comprising: preparing epoxypropane by contacting a mixed gas consisting of a reaction feed gas and a diluent gas with a catalyst to carry out reaction under reaction conditions of propylene epoxidation, wherein the reaction feed gas comprises propylene, oxygen gas and hydrogen gas; at least a portion of the diluent gas is a gaseous olefin.

Alternatively, the method comprises: preparing epoxypropane by contacting a mixed gas consisting of a reaction feed gas and a diluent gas with a catalyst to carry out reaction under the reaction conditions of propylene epoxidation, wherein the reaction feed gas comprising propylene, oxygen gas and hydrogen gas; the diluent gas includes a gaseous olefin or is a gaseous olefin.

Generally in the direct epoxidation of propylene, an inert gas, such as nitrogen gas or argon gas, is usually selected and used as a diluent gas, such that the reaction is safer and the combustion and explosion risk is lower. However, the present inventors have found during their researches that, in the case of using a non-inert gas (e.g., gaseous olefin) as at least a portion of the diluent gas, such an arrangement can increase service life of the catalyst, reduce dosage of the diluent gas and improve the oxygen tolerance of the reaction system, thereby alleviating the stress of subsequent separation process of the reaction products and reducing the risk of combustion and explosion. In addition, the relative concentration of the reactant gas is increased due to the reduced dosage of the diluent gas, which effectively pushes the forward direction proceeding of reaction process, thereby increasing selectivity and conversion rate of the reaction. Furthermore, the driving and separation energy consumption of the diluent gas is decreased due to the reduced dosage of the diluent gas.

According to the present disclosure, the term "at least a portion" may be at least 0.1 vol. %, 1 vol. %, 5 vol. %, 10 vol. %, 15 vol. %, 20 vol. %, 25 vol. %, 30 vol. %, 35 vol. %, 40 vol. %, 45 vol. %, 50 vol. %, 55 vol. %, 60 vol. %, 65 vol. %, 70 vol. %, 75 vol. %, 80 vol. %, 85 vol. %, 90 vol. %, 91 vol. %, 92 vol. %, 93 vol. %, 94 vol. %, 95 vol. %, 96 vol. %, 97 vol. %, 98 vol. %, 99 vol. %, 100 vol. %.

According to the present disclosure, the diluent gas can contain gaseous olefin in an amount of 0.1 vol. %, 1 vol. %, 5 vol. %, 10 vol. %, 15 vol. %, 20 vol. %, 25 vol. %, 30 vol. %, 35 vol. %, 40 vol. %, 45 vol. %, 50 vol. %, 55 vol. %, 60 vol. %, 65 vol. %, 70 vol. %, 75 vol. %, 80 vol. %, 85 vol. %, 90 vol. %, 91 vol. %, 92 vol. %, 93 vol. %, 94 vol.

%, 95 vol. %, 96 vol. %, 97 vol. %, 98 vol. %, 99 vol. %, 99.9 vol. %, or the diluent gas can be a gaseous olefin.

It should be noted that the advantages of the present disclosure associated with increasing oxygen concentration in direct epoxidation of propylene, extending the service life of catalyst, reducing dosage of diluent gas, increasing reaction selectivity and conversion rate, and decreasing energy consumption are produced relative to a circumstance of using nitrogen gas as a diluent gas.

Preferably, the gaseous olefin is a $C_2$-$C_4$ olefin, such as at least one of ethylene, propylene and butylene.

According to the present disclosure, it is generally the case that the concentration of oxygen in the mixed gas shall not be more than 10 vol. %, preferably not more than 5 vol. %, in order to ensure safety of the reaction, while in the case where at least a portion of the diluent gas is a gaseous olefin, the proportion of oxygen gas in the mixed gas may be more than 14 vol. %, preferably not more than 60 vol. %, for instance, 14 vol. %, 15 vol. %, 16 vol. %, 17 vol. %, 18 vol. %, 19 vol. %, 20 vol. %, 21 vol. %, 22 vol. %, 23 vol. %, 24 vol. %, 25 vol. %, 26 vol. %, 27 vol. %, 28 vol. %, 29 vol. %, 30 vol. %, 32 vol. %, 34 vol. %, 36 vol. %, 38 vol. %, 40 vol. %, 42 vol. %, 44 vol. %, 46 vol. %, 48 vol. %, 50 vol. %, 52 vol. %, 54 vol. %, 56 vol. %, 58 vol. %, 60 vol. %. The proportion of oxygen in the mixed gas is preferably more than 20 vol. %, further preferably more than 22 vol. %.

As can be seen from the above description, the method of the present disclosure allows for increased dosage of oxygen gas and increased concentration of reactant gas, and can promote forward direction proceeding of the reaction.

According to a general circumstance of the present disclosure, in order to ensure safety of the reaction, the proportion of the diluent gas in the mixed gas shall not to be less than 70 vol. %, while in the case that at least a portion of the diluent gas is a gaseous olefin, the proportion of the diluent gas in the mixed gas is not more than 60 vol. %, for example, it may be 15 vol. %, 20 vol. %, 25 vol. %, 30 vol. %, 35 vol. %, 40 vol. %, 45 vol. %, 50 vol. %, 55 vol. %, 60 vol. %; more preferably less than 55 vol. %, further preferably less than 35 vol. %.

As illustrated by the above content, the method of the present disclosure can reduce dosage of diluent gas and alleviate stress of the subsequent separation process of reaction products.

According to the present disclosure, the volume ratio of the used amounts of propylene (reaction feed gas), oxygen gas, and hydrogen gas is preferably 0.2-2.5:0.2-2.5:1.

According to a particularly preferred embodiment of the present disclosure, the gaseous olefin is propylene. The inventors of the present disclosure have innovatively found that, in the case of using propylene as at least a portion of the diluent gas, propylene acts as both a diluent gas and a reactant gas, can further promote the forward direction proceeding of the reaction. It shall be noted in the present disclosure that the term "in the case of using propylene as at least a portion of the diluent gas" refers to that at least part of the diluent gas is replaced by propylene, thereby causing a significantly excessive amount of propylene in the mixed gas. That is, the portion of propylene does not act as a reaction feedstock which is excessively added in the normal sense which promotes the forward direction proceeding of reaction by increasing the used amount of reaction feedstock, but instead using as a diluent gas, does not serve to counteract the excessively added amount of reaction feedstock which is used for promoting the forward direction proceeding of reaction. Therefore, in the case of the present disclosure, it cannot be simply considered that the propylene is excessive, unlike the excessive amount in the conventional understanding of meanings.

According to the present disclosure, in order to further extend the service life of the catalyst, reduce the used amount of the diluent gas, improve the oxygen gas tolerance, and increase the selectivity and conversion rate of the reaction, it is preferable that the propylene epoxidation is carried out in the presence of an alkali.

According to the present disclosure, the alkali may be an alkaline gas, or an alkaline substance present in a gaseous form under the reaction conditions of propylene epoxidation.

According to the present disclosure, the kind of the alkali is not particularly restricted, so long as it can provide an alkaline condition for the propylene epoxidation. Preferably, the alkali is a compound having a lone pair of electrons and/or a substance capable of accepting protons.

Examples of the compound having a lone electron pair may include at least one selected from the group consisting of ammonia, pyridine, hydrazine, cyanogen, amine, alcohol, ether and thiol.

Examples of the substance capable of accepting protons is at least one selected from the group consisting of $Cl^-$, $[Al(H_2O)_5OH]^{2+}$, $Ac^-$, $HPO_4^{2-}$ and $PO_4^{3-}$.

According to a preferred embodiment of the present disclosure, the alkali is ammonia.

According to the present disclosure, the manner of introducing the alkali into the reaction system is not particularly limited, and the alkali can be introduced into the reaction system by any one of the following modes:

(1) without changing the gas path, a certain amount of alkali is added during the process of preparing the reaction feed gas. For example, an alkaline gas is added into $H_2$, so as to prepare a mixed gas of the $H_2$ and alkaline gas, the mixed gas is introduced into the reaction system through the $H_2$ gas path, without modifying the piping layout of the original reaction equipment.

(2) a new gas pipeline is supplemented and connected to the reaction system, the alkali is introduced through the new pipeline and sufficiently blended with the original reaction feed gas in the mixer, the mixed gas is fed into the reactor.

(3) modification is made on the gas path of reaction feed gas or diluent gas, such that the reaction feed gas or diluent gas passes through an alkaline environment, the alkali and the reaction feed gas or diluent gas are introduced into the reactor.

According to the present disclosure, the added amount of the alkali may vary within a wide range. Preferably, the used amount of the alkali in the mixed gas is 1-10,000 ppm, for example, it may be 1 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, 1,000 ppm, 2,000 ppm, 3,000 ppm, 4,000 ppm, 5,000 ppm, 6,000 ppm, 7,000 ppm, 8,000 ppm, 9,000 ppm, 10,000 ppm; preferably 10-1,000 ppm, further preferably 100-800 ppm.

According to a preferred embodiment of the present disclosure, the gaseous olefin is propylene and the propylene epoxidation is carried out in the presence of alkali. The proportion of oxygen gas in the mixed gas may be more than 16 vol. %, but is preferably not more than 60 vol. %, for example, the proportion of oxygen gas in the mixed gas may be 16 vol. %, 17 vol. %, 18 vol. %, 19 vol. %, 20 vol. %, 21 vol. %, 22 vol. %, 23 vol. %, 24 vol. %, 25 vol. %, 26 vol.

%, 27 vol. %, 28 vol. %, 29 vol. %, 30 vol. %, 31 vol. %, 32 vol. %, 33 vol. %, 34 vol. %, 35 vol. %, 36 vol. %, 38 vol. %, 40 vol. %, 42 vol. %, 44 vol. %, 46 vol. %, 48 vol. %, 50 vol. %, 52 vol. %, 54 vol. %, 56 vol. %, 58 vol. %, 60 vol. %. The proportion of oxygen gas in the mixed gas is more preferably more than 22 vol. %, and further preferably more than 25 vol. %. The proportion of diluent gas in the mixed gas may be less than 57.5 vol. %, for example, it may be 10 vol. %, 12 vol. %, 15 vol. %, 20 vol. %, 22 vol. %, 23 vol. %, 24 vol. %, 25 vol. %, 30 vol. %, 35 vol. %, 40 vol. %, 45 vol. %, 50 vol. %, 55 vol. %, 57.5 vol. %; the proportion of diluent gas in the mixed gas is more preferably less than 40 vol. %, and further preferably less than 33.5 vol. %.

According to the present disclosure, in the above case, the volume ratio of the used amounts of propylene (reaction feed gas), oxygen gas and hydrogen gas is preferably 0.1-3:0.1-3:1.

As can be seen, provided that the propylene epoxidation is carried out in the presence of an alkali, the used amount of diluent gas can be further reduced, the dosage of oxygen gas is increased, the concentration of reactant gas is improved, so as to promote the forward direction proceeding of the reaction; in addition, the used amount of diluent gas can be further decreased, in order to alleviate the stress of the subsequent separation process of the reaction products.

It shall be noted that when propylene is used as a diluent gas, the increased conversion rate of propylene as described herein is calculated with respect to the amount of propylene used as a reactant gas, and does not factor in the amount of propylene used as a diluent gas.

According to the present disclosure, the propylene epoxidation may be carried out in a conventional reactor in the art, as long as the gaseous olefin according to the present disclosure is selected as at least a portion of the diluent gas, the service life of the catalyst for the direct epoxidation of propylene can be increased, the used amount of diluent gas is decreased and the used amount of reactant gas used is increased, the reaction selectivity and conversion rate are improved, and the energy consumption is reduced.

According to a specific embodiment of the present disclosure, the propylene epoxidation is carried out in a tubular reactor. The tubular reactor may be various tubular reactor commonly used in the art, for example, a quartz tube reactor.

In accordance with another preferred embodiment of the present disclosure, the epoxidation is carried out in a microchannel reactor in order to further achieve the purpose of the present disclosure. In a microchannel reactor, although the flame propagation may be quenched due to the wall effect of the microchannel, so that the concentration of the reactants is no longer limited by the explosion limit, the oxygen concentration limitation may be disregarded, i.e., a diluent gas may not be used. However, under a general circumstance, since the diluent gas acts as a purge gas, which can timely separate the reaction product epoxypropane from the catalytic activity center to promote forward direction movement of the reaction equilibrium. Therefore, for the sake of ensuring the reaction efficiency, a certain percentage of the diluent gas is generally used, e.g., the proportion of the diluent gas in the mixed gas is generally not less than 40 vol. %.

According to the present disclosure, the microchannel reactor may be various kind of conventional reactor, the present disclosure is not particularly limited thereto. According to a preferred embodiment of the present disclosure, one or more flow perturbing members are disposed in the microchannel reactor, and the catalyst is filled in at least a portion of the flow perturbing members. When a plurality of flow perturbing members are disposed in the microchannel reactor, the plurality of flow perturbing members may form a serpentine configuration, and the catalyst may be filled in a segment of the channels or all of the channels of the serpentine configuration.

The shape of the flow perturbing member is not particularly limited herein, and preferably, the flow perturbing member has a shape selected from the group consisting of heart, diamond, S-shape, triangle, rectangle, square, circle, crossed finger type, spiral, V-shape, T-shape and C-shape.

The term "crossed finger type" means that the flow perturbing member is a hollow tube of braided construction, the hollow tube being axially arranged with a plurality of connecting rods, a braid being alternately and orthogonally braided along a direction perpendicular with the connecting rods.

According to a specific embodiment of the present disclosure, the microchannel reactor is provided with a plurality of heart-shaped structures therein, as shown in FIG. 1. In the preferred embodiment, gaseous olefin is used as at least a portion of the diluent gas, under a circumstance that the proportion of the diluent gas in the mixed gas is reduced to less than 30 vol. %, for example, 10 vol. %, 15 vol. %, 25 vol. %, 30 vol. %, it can also effectively ensure a comparable or higher propylene conversion rate and product selectivity for the reaction.

Figure 2:
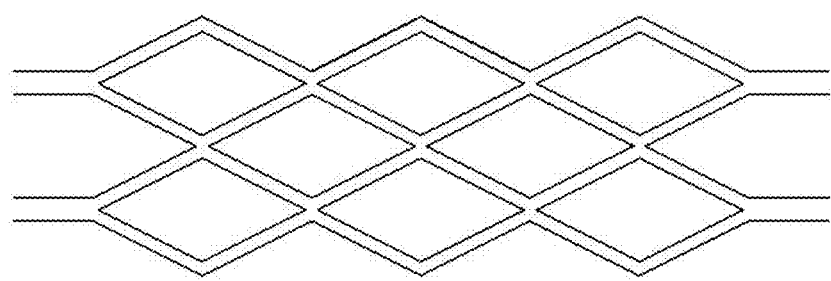
FIG. 2 illustrates a microchannel reactor with a diamond-shaped structure used in the present disclosure.

According to a specific embodiment of the present disclosure, the microchannel reactor is provided with a plurality of diamond-shaped structures therein, as shown in FIG. 2. In the preferred embodiment, gaseous olefin is used as at least a portion of the diluent gas, under a circumstance that the proportion of the diluent gas in the mixed gas is reduced to less than 30 vol. %, for example, 10 vol. %, 15 vol. %, 25 vol. %, 30 vol. %, it can also effectively ensure a comparable or higher propylene conversion rate and product selectivity for the reaction.

Figure 3:
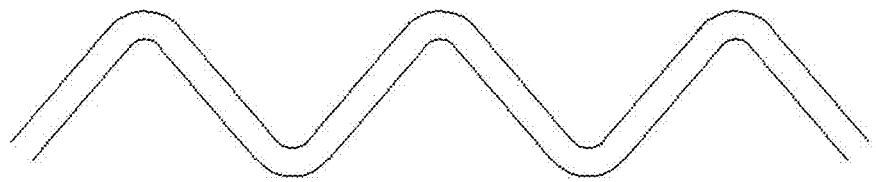
FIG. 3 illustrates a microchannel reactor with a S-shaped structure used in the present disclosure.

According to a specific embodiment of the present disclosure, the microchannel reactor is provided with a plurality of S-shaped structures therein, as shown in FIG. 3. In the preferred embodiment, gaseous olefin is used as at least a portion of the diluent gas, under a circumstance that the proportion of the diluent gas in the mixed gas is reduced to less than 30 vol. %, for example, 10 vol. %, 15 vol. %, 25 vol. %, 30 vol. %, it can also effectively ensure a comparable or higher propylene conversion rate and product selectivity for the reaction.

Figure 4:
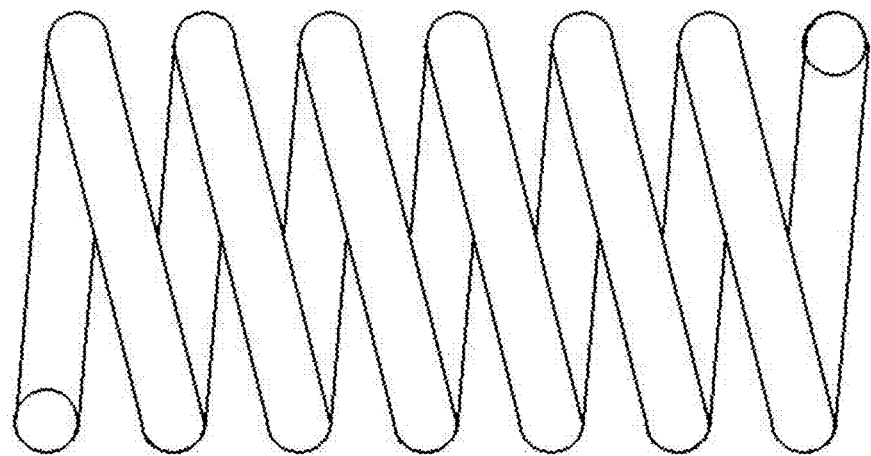
FIG. 4 illustrates a spiral reactor used in the present disclosure.

According to a specific embodiment of the present disclosure, the microchannel reactor is a spiral microchannel reactor, as shown in FIG. 4, the catalyst is filled in at least a portion of the spiral structure. The spiral microchannel reactor may be a spirally formed serpentine structure, wherein the catalyst may be filled in a segment of the channels of the serpentine structure or all of the channels. In the preferred embodiment, gaseous olefin is used as at least a portion of the diluent gas, under a circumstance that the proportion of the diluent gas in the mixed gas is reduced to less than 30 vol. %, for example, 10 vol. %, 15 vol. %, 25 vol. %, 30 vol. %, it can also effectively ensure a comparable or higher propylene conversion rate and product selectivity for the reaction.

According to the present disclosure, the length of the microchannel reactor may be varied within a wide range, the length is preferably within a range of 1-1,000 mm, more preferably 10-500 mm. When a plurality of flow perturbing members are disposed in the microchannel reactor, the length of each flow perturbing member is preferably 1-100 mm, more preferably 5-50 mm.

According to the present disclosure, the width of the microchannel reactor in the radial direction is not particularly limited, as long as the criterion for the microchannel reactor is met; the microchannel reactor according to the present disclosure may have a width in the radial direction being identical with a length along the microchannel reactor (for example, when the microchannel reactor is a spiral microchannel reactor), or different from a length along the microchannel reactor (for example, when the microchannel reactor is provided with heart-shaped structure flow perturbing members therein); according to a preferred embodiment of the present disclosure, when the width in the radial direction is identical with the length, the width in the radial direction is within a range of 20-2,000 μm; when the width in the radial direction is different from the length, the width in the radial direction has a minimum of 10-1,000 μm, and a maximum of 100-3,000 μm.

According to the present disclosure, the material of the microchannel reactor may be any material which can withstand the reaction temperatures of the present disclosure and does not react with the raw materials and products of the present disclosure, for example, the material may be organic glass, ceramic glass, stainless steel metal, quartz, resin materials and the like.

According to the present disclosure, the catalyst may have any size and shape suitable for the tubular reactor or the microchannel reactor.

According to the present disclosure, the catalyst may be any catalyst disclosed in the prior art that is capable of catalytically reacting with propylene, oxygen gas, hydrogen gas and diluent gas to produce epoxypropane. Preferably, the catalyst is a supported metal catalyst comprising a carrier and an active metal component, wherein the active metal component may be at least one selected from the group consisting of gold, silver, copper, ruthenium, palladium, platinum, rhodium, cobalt, nickel, tungsten, bismuth, molybdenum and oxides thereof, preferably gold; the carrier for supporting the metal may be carbon black, activated carbon, silica, alumina, ceria and zeolite, preferably zeolite, more preferably a titanium-silicon molecular sieve.

According to the present disclosure, the content of the metal in terms of the metal element in the supported metal catalyst may vary within a wide range, for example, the content of the active metal component in terms of the metal element in the catalyst may be 0.01-50 wt %, for example, the content may be 0.01 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 3 wt %, 4 wt %, 5 wt %, 10 wt %, 15 wt %, 20 wt %, 25 wt %, 30 wt %, 35 wt %, 40 wt %, 45 wt %, 50 wt %, preferably 0.05-5 wt %, more preferably 0.1-2 wt %, based on the total weight of the catalyst.

According to a preferred embodiment of the present disclosure, the catalyst is a gold-loaded titanium-silicon molecular sieve (Au@TS-1), wherein the loading amount of the active metal component in terms of the element Au is within a range of 0.1-2 wt %, the TS-1 molecular sieve may be prepared by means of hydrothermal synthesis, and the active metal component Au may be loaded by means of the deposition-precipitation process.

Figure 5A:
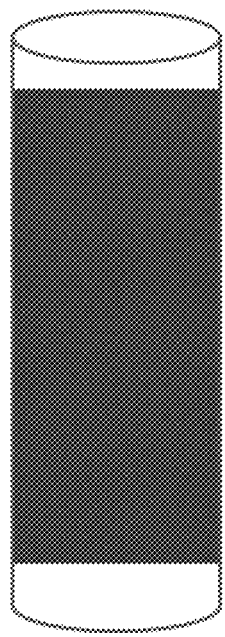
FIGS. 5A-5C illustrate a filling mode of the catalyst provided by the present disclosure.

According to the present disclosure, the catalyst may be filled alone in a reactor for propylene epoxidation (as shown in FIG. 5A), or in combination with other inert materials.

However, in order to further increase the service life of the catalyst, increase the reaction selectivity, the conversion rate, the space-time yield and the hydrogen gas utilization rate, and reduce the used amount of the catalyst, the catalyst is preferably filled in the reactor in a form of combining the catalyst with an inert filler, wherein the inert filler may be an inert solid phase substance conventionally used in the art, and preferably the inert filler is at least one selected from the group consisting of silica sand, $Al_2O_3$, porous silica gel and ceramic ring.

Wherein the used amount of the inert filler may vary within a wide range, but preferably, the used amount of the inert filler is 1-200 parts by weight (for example, 1 part by weight, 10 parts by weight, 20 parts by weight, 50 parts by weight, 80 parts by weight, 90 parts by weight, 95 parts by weight, 100 parts by weight, 105 parts by weight, 110 parts by weight, 115 parts by weight, 120 parts by weight, 125 parts by weight, 130 parts by weight, 135 parts by weight, 140 parts by weight, 145 parts by weight, 150 parts by weight, 160 parts by weight, 170 parts by weight, 180 parts by weight, 190 parts by weight, 200 parts by weight), preferably 80-150 parts by weight, and more preferably 90-110 parts by weight, relative to 1 part by weight of the catalyst.

Figure 5B:
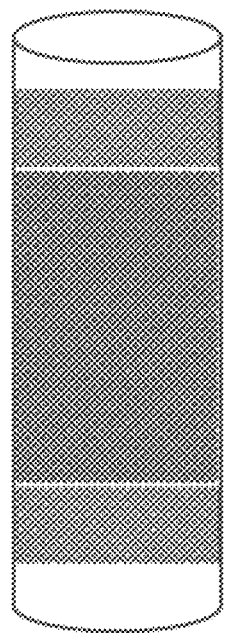
Figure 5C:
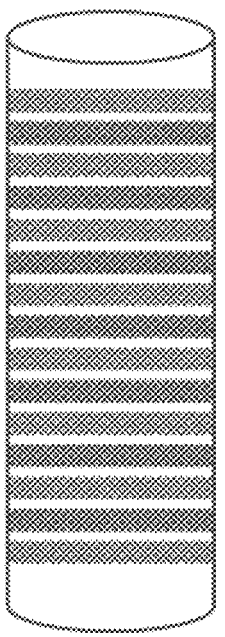

The mode of combining the catalyst and the inert filler are not particularly limited in the present disclosure, for example, the catalyst and the inert filler can be directly mixed and then filled in the reactor, or the catalyst and the inert filler can be designed with a sandwich structure (as shown in FIG. 5B), wherein the catalyst or the inert filler is disposed in the middle. However, the present inventors have found in the researches that the catalyst and the inert filler are preferably filled in the reactor in a layered stacking manner, more preferably, the catalyst and the inert filler are filled in the reactor in an alternately layered stacking manner (as shown in FIG. 5C), can further increase service life of the catalyst, the selectivity, conversion rate, space-time yield of the reaction, and the hydrogen gas utilization rate, and reduce the used amount of the catalyst. Wherein under the stacking manner, the height of each layer of the catalyst and the height of each layer of the inert filler can be selected from a wide range, the catalyst and the inert filler are subjected to the layered stacking by means of an equal height fashion or an unequal height fashion; and preferably, each layer of the catalyst and each layer of the inert filler are independently subjected to stacking in a mode of 1-2,000 layers/m, for example, 1 layer/m, 2 layers/m, 3 layers/m, 4 layers/m, 5 layers/m, 6 layers/m, 7 layers/m, 8 layers/m, 9 layers/m, 10 layers/m, 15 layers/m, 18 layers/m, 20 layers/m, 50 layers/m, 100 layers/m, 200 layers/m, 300 layers/m, 400 layers/m, 500 layers/m, 600 layers/m, 700 layers/m, 800 layers/m, 900 layers/m, 1,000 layers/m, 1,200 layers/m, 1,400 layers/m, 1,600 layers/m, 1,800 layers/m, 2,000 layers/m; preferably 1,000-2,000 layers/m, or 10-20 layers/m.

According to the present disclosure, the layer height ratio of each layer of the catalyst and each layer of the inert filler may vary within a wide range, and preferably, in order to further enhance the effect of the present disclosure, the layer height ratio of each layer of the catalyst and each layer of the inert filler is 1:1-10, for example, the layer height ratio may be 1:1, 1:2, 1:3, 1:4, 1:5, 1:6, 1:7, 1:8, 1:9, 1:10, preferably 1:1-3, and further preferably 1:1.5-2.5.

According to the present disclosure, the manner of filling the catalyst in the reactor may be not particularly restricted, for example, a coating method, an electrodeposition method, a solution electroplating method, a mechanical filling method may be employed.

According to the present disclosure, it is preferred that the filling amount of the catalyst is 0.1-0.5 g with respect to a reactor having a volume of 10 mL. Under normal conditions, the filling amount of the catalyst is at least 1 g; as can be seen, the technical solution of the present disclosure can further reduce the loading amount of the catalyst.

According to the present disclosure, the temperature of the propylene epoxidation may be a conventional reaction temperature in the art, for example, 20-300° C.; however, in order to further improve the conversion rate, selectivity, space-time yield of the reaction and the utilization rate of hydrogen gas, and extend the service life of the catalyst, and reduce the used amount of the catalyst, the reaction temperature is preferably within a range of 50-250° C., more preferably 120-200° C., for example, 120° C., 125° C., 130° C., 135° C., 140° C., 145° C. 150° C., 155° C., 160° C., 165° C., 170° C., 175° C., 180° C., 185° C., 190° C., 195° C., 200° C.

The inventors of the present disclosure have found in researches that the temperature rise rate of the system can also further influence the conversion rate, selectivity, space-time yield of the reaction and hydrogen utilization rate, the service life of the catalyst, the used amount of the catalyst; when the temperature of the reaction system is increased to the temperature required for the propylene epoxidation at a rate of 0.1-10° C. $min^{-1}$, preferably 0.5-5° C. $min^{-1}$, more preferably 0.5-2° C. $min^{-1}$ (e.g., 0.5° C. $min^{-1}$, 0.8° C. $min^{-1}$, 1.0° C. $min^{-1}$, 1.2° C. $min^{-1}$, 1.5° C. $min^{-1}$, 2.0° C. $min^{-1}$, further preferably 0.8-1.5° C. $min^{-1}$), the conversion rate, selectivity, space-time yield of the reaction, and the utilization rate of hydrogen gas can be further increased, the service life of the catalyst can be improved, the used amount of the catalyst and the diluent gas are reduced.

According to the present disclosure, in order to further improve the efficiency of the reaction, the mixed gas is also preferably preheated prior to contacting the mixed gas with the catalyst.

According to the present disclosure, the degree of preheating preferably reaches at least 50%, for example, 50%, 55%, 60%, 65%, 70%, 75%, 80%, 85%, of the target reaction temperature.

According to the present disclosure, the pressure of the propylene epoxidation may be a conventional reaction pressure in the art, for example, the pressure may be within a range of 0-5 MPa; however, in order to further increase the conversion rate, selectivity, space-time yield of the reaction and the utilization rate of hydrogen gas, extend the service life of the catalyst, reduce the used amount of the catalyst, the reaction pressure is preferably 0-1.5 MPa, more preferably 0.05-0.25 MPa; for example, the reaction pressure may be 0.05 MPa, 0.07 MPa, 0.09 MPa, 0.11 MPa, 0.13 MPa, 0.15 MPa, 0.17 MPa, 0.19 MPa, 0.21 MPa, 0.23 MPa, 0.25 MPa.

According to the present disclosure, the hourly space velocity of the propylene epoxidation may be a conventional volumetric hourly space velocity of reaction in the art; however, in order to further increase the conversion rate, selectivity, space-time yield of the reaction and the utilization rate of hydrogen gas, extend the service life of the catalyst, reduce the used amount of the catalyst, the volumetric hourly space velocity of the reaction is preferably 500-30,000 mL $g_{cat}^{-1}$ $h^{-1}$, more preferably 1,000-20,000 mL $g_{cat}^{-1}$ $h^{-1}$, further preferably 2,000-15,000 mL $g_{cat}^{-1}$ $h^{-1}$, for instance, the volumetric hourly space velocity may be 2,000 mL $g_{cat}^{-1}$ $h^{-1}$, 3,000 mL $g_{cat}^{-1}$ $h^{-1}$, 4,000 mL $g_{cat}^{-1}$ $h^{-1}$, 5,000 mL $g_{cat}^{-1}$ $h^{-1}$, 6,000 mL $g_{cat}^{-1}$ $h^{-1}$, 7,000 mL $g_{cat}^{-1}$ $h^{-1}$ 8,000 mL $g_{cat}^{-1}$ $h^{-1}$, 9,000 mL $g_{cat}^{-1}$ $h^{-1}$, 10,000 mL $g_{cat}^{-1}$ $h^{-1}$, 12,000 mL $g_{cat}^{-1}$ $h^{-1}$, 13,000 mL $g_{cat}^{-1}$ $h^{-1}$, 14,000 mL $g_{cat}^{-1}$ $h^{-1}$, 15,000 mL $g_{cat}^{-1}$ $h^{-1}$.

According to the present disclosure, the flow velocities of propylene, oxygen gas, hydrogen gas and diluent gas are not particularly restricted, so long as it is ensured that mixing is performed in the aforementioned used amount and volume ratio.

The method of the present disclosure may further comprise subjecting the reaction products to a composition analysis, which may be performed by using a gas chromatography apparatus, for example, the reaction products are introduced into a gas chromatography equipped with a thermal conductivity detector (TCD) and a flame ionization detector (FID) for subjecting to an analysis.

More preferably, for the sake of ensuring effects of the analysis, the reaction products are transported into the gas chromatography apparatus for subjecting to an analysis under the heating condition of 50-200° C., and a heating belt may be disposed between the outlet of the reactor and the sample feed port of the component analysis apparatus to maintain a temperature of 50-200° C., preferably 80-150° C., for example, 80° C., 90° C., 100° C., 110° C., 120° C., 130° C., 140° C., 150° C.

According to the present disclosure, the propylene epoxidation provided by the method of the present disclosure is preferably carried out in the absence of a solvent, wherein the solvent comprises any liquid phase introduced from any outer source.

According to the present disclosure, in order to further increase the conversion rate, selectivity, space-time yield of the reaction and the utilization rate of hydrogen gas, extend the service life of the catalyst, and reduce the used amount of the catalyst and the used amount of the diluent gas, the method further comprises: blending a first feed gas and a second feed gas to obtain the mixed gas;

wherein the first feed gas contains oxygen gas and is free or substantially free of hydrogen gas, the second feed gas contains hydrogen gas and is free or substantially free of oxygen gas, the first feed gas and/or the second feed gas contain propylene, and at least one of the first feed gas and the second feed gas further comprises a gaseous olefin.

According to the present disclosure, the proportion of gaseous olefin in the first feed gas or the second feed gas is not particularly limited, and it may be any value or range of total gaseous olefin between 0 and 100%, for example, 0, 0.01%, 0.1%, 1%, 10%, 20%, 30%, 40%, 50%, 60%, 70%, 80%, 90%, 100%, 0.05-100%, 50-90% and the like.

According to the present disclosure, the proportion of propylene in the first feed gas or the second feed gas is not particularly limited, and it may be any value or range of total propylene between 0 and 100%, for example, 0, 0.01%, 0.1%, 1%, 10%, 20%, 30%, 40%, 50%, 60%, 70%, 80%, 90%, 100%, 0.05-100%, 50-90% and the like.

Preferably, the first feed gas does not contain hydrogen gas.

Wherein the term "substantially free of hydrogen gas" refers to that the amount of hydrogen gas contained in the first feed gas is insufficient to trigger an explosion, e.g., the volume fraction of hydrogen gas in the first feed gas is less than 4% (excluding 4%), for example, the volume fraction may be 3.5% or less, 3% or less, 2.5% or less, 2% or less, 1.5% or less, 1% or less, 0.5% or less, 0.1% or less.

Preferably, the second feed gas does not contain oxygen gas.

Wherein the term "substantially free of oxygen gas" refers to that the amount of oxygen gas contained in the second feed gas is insufficient to trigger an explosion, e.g., the volume fraction of oxygen gas in the second feed gas is less than 25% (excluding 25%), e.g., 20% or less, 15% or less, 10% or less, 8% or less, 5% or less, 4% or less, 3% or less, 2% or less, 1% or less, 0.5% or less, 0.1% or less.

According to a preferred embodiment of the present disclosure, the first feed gas contains oxygen gas and is free or substantially free of hydrogen gas, contains at least a portion of propylene and at least a portion of gaseous olefin; the second feed gas contains hydrogen gas and is free or substantially free of oxygen gas, contains the remainder of the propylene and the remainder of the gaseous olefin; or
the second feed gas contains hydrogen gas and is free or substantially free of oxygen gas, contains at least a portion of propylene and at least a portion of gaseous olefin; the first feed gas contains oxygen gas and is free or substantially free of hydrogen gas, contains the remainder of the propylene and the remainder of the gaseous olefin.

According to a further preferred embodiment A of the present disclosure, the first feed gas contains oxygen gas and is free or substantially free of hydrogen gas, contains all the propylene and all the gaseous olefin; the second feed gas contains hydrogen gas and is free or substantially free of oxygen gas.

According to a further preferred embodiment B of the present disclosure, the first feed gas contains oxygen gas and is free or substantially free of hydrogen gas, contains all the propylene and a portion of gaseous olefin (>0); the second feed gas contains hydrogen gas and is free or substantially free of oxygen gas, contains the remainder of the gaseous olefin.

According to a further preferred embodiment C of the present disclosure, the first feed gas contains oxygen gas and is free or substantially free of hydrogen gas, contains a portion of propylene (>0) and a portion of gaseous olefin (>0); the second feed gas contains hydrogen gas and is free or substantially free of oxygen gas, contains the remainder of the propylene and the remainder of the gaseous olefin.

According to a further preferred embodiment D of the present disclosure, the first feed gas contains oxygen gas and is free or substantially free of hydrogen gas, contains a portion of propylene (>0) and all the gaseous olefin; the second feed gas contains hydrogen gas and is free or substantially free of oxygen gas, contains the remainder of the propylene.

According to a further preferred embodiment E of the present disclosure, the first feed gas contains oxygen gas and is free or substantially free of hydrogen gas, contains all the gaseous olefin; the second feed gas contains hydrogen gas and is free or substantially free of oxygen gas, contains all the propylene.

According to a further preferred embodiment F of the present disclosure, the first feed gas contains oxygen gas and is free or substantially free of hydrogen gas, contains a portion of gaseous olefin (>0); the second feed gas contains hydrogen gas and is free or substantially free of oxygen gas, contains the remainder of the gaseous olefin and all the propylene.

According to a further preferred embodiment G of the present disclosure, the first feed gas contains oxygen gas and is free or substantially free of hydrogen gas, contains a portion of propylene (>0); the second feed gas contains hydrogen gas and is free or substantially free of oxygen gas, contains all the gaseous olefin and the remainder of the propylene.

According to a further preferred embodiment H of the present disclosure, the first feed gas contains oxygen gas and is free or substantially free of hydrogen gas; the second feed gas contains hydrogen gas and is free or substantially free of oxygen gas, contains all the gaseous olefin and all the propylene.

In the present disclosure, "a portion of gaseous olefin" as mentioned above refers to any numerical number between 0-100 vol % (excluding endpoint values), e.g., 0.1 vol %, 1 vol %, 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, 91 vol %, 92 vol %, 93 vol %, 94 vol %, 95 vol %, 96 vol %, 97 vol %, 98 vol %, 99 vol %, 99.5 vol %.

In the present disclosure, "a portion of propylene" as mentioned above refers to any numerical number between 0-100 vol % (excluding endpoint values), e.g., 0.1 vol %, 1 vol %, 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, 91 vol %, 92 vol %, 93 vol %, 94 vol %, 95 vol %, 96 vol %, 97 vol %, 98 vol %, 99 vol %, 99.5 vol %.

According to a preferred embodiment of the present disclosure, the concentration of oxygen gas in the first feed gas and the mixed gas each independently satisfies the following formula:

$$X_{O2} \leq 1 - \frac{1}{\sum \frac{X_n}{N_n} + \frac{X_{propylene}}{N_{propylene}} + \frac{X_{hydrogen}}{N_{hydrogen}}}, \text{ or} \quad \text{Formula (1)}$$

$$X_{O2} \geq 1 - \frac{1}{\sum \frac{X_n}{L_n} + \frac{X_{propylene}}{L_{propylene}} + \frac{X_{hydrogen}}{L_{hydrogen}}}; \quad \text{Formula (2)}$$

wherein,
$X_{O2}$ denotes the volume fraction (%) of oxygen gas in the mixed gas;
$X_n$ denotes the volume fraction (%) of the gaseous olefin n in the mixed gas;
$X_{propylene}$ denotes the volume fraction (%) of propylene in the mixed gas;
$X_{hydrogen}$ denotes the volume fraction (%) of hydrogen gas in the mixed gas;
$N_n$ denotes the lower explosion limit (%) of the gaseous olefin n in the mixed gas;
$N_{propylene}$ denotes the lower explosion limit (%) of propylene in the mixed gas;
$N_{hydrogen}$ denotes the lower explosion limit (%) of hydrogen gas in the mixed gas;
$L_n$ denotes the upper explosion limit (%) of the gaseous olefin n in the mixed gas;
$L_{propylene}$ denotes the upper explosion limit (%) of propylene in the mixed gas;
$L_{hydrogen}$ denotes the upper explosion limit (%) of hydrogen gas in the mixed gas.

In the above preferred embodiments, an explosion of the reaction system can be effectively avoided by controlling the concentration of oxygen gas to be within the range of Formula (1) or Formula (2) mentioned above, such that the reaction can be carried out safely.

It should be noted, when the concentration of oxygen gas in the first feed gas is controlled, the mixed gas as mentioned above refers to the first feed gas, and when the concentration of oxygen gas in the mixed gas is controlled, the mixed gas as mentioned above refers to a gas mixture.

According to the present disclosure, the explosion limit range of propylene is defined as the explosion limit range determined by the combustion and explosion test method for combustible gas in an enclosed space under the room temperature and atmospheric pressure (the test is performed according to the relevant provisions in the National Standard GB/T12474-2008 of China). The explosion limit range is 2-11%, wherein the lower explosion limit is 2%, and the upper explosion limit is 11%.

It is understandable that when propylene is used as a diluent gas, Xpropylene may refer to the volume fraction of total propylene in the system, the addition sum of propylene as a diluent gas is zero; in addition, the formula may be calculated based on the amount of propylene used as a diluent gas and the amount of propylene used as a reactant gas.

According to the present disclosure, the explosion limit range of hydrogen gas is defined as the explosion limit range determined by the combustion and explosion test method for combustible gas in an enclosed space under the room temperature and atmospheric pressure (the test is performed according to the relevant provisions in the National Standard GB/T12474-2008 of China). The explosion limit range of hydrogen gas is 4-75%, wherein the lower explosion limit is 4%, and the upper explosion limit is 75%.

The present disclosure will be described in detail below with reference to examples.

The tubular reactor was a quartz tube reactor with a diameter of 3 cm.

A microchannel reaction unit comprising a mixer, a preheater and a microchannel reactor, wherein an inside of each of the mixer, the preheater and the microchannel reactor was provided with a plurality of flow perturbing members having a heart-shaped structure as shown in FIG. 1, the differences resided in that an inside of the microchannel reactor was filled with the catalyst, an outer circumference of the microchannel reactor was provided with one or more temperature control devices, and an outer circumference of the preheater was disposed with one or more heating devices; wherein each of the heart-shaped structures had a length of 7 mm, the maximum width of the heart-shaped structure was 2 mm at its widest point, and a pipeline connecting two adjacent heart-shaped structures had a circular cross-section, a diameter of 1 mm, and the total length of the microchannel reactor was 1 cm.

Product analysis was performed by using two gas chromatographs for subjecting the product samples to the gas chromatographic analysis. Both analytical chromatography models were Agilent 7890B, wherein the chromatography column of gas chromatography A was (1) HayeSep Q column (SFt 0.9 m, OD ⅛, ID 2 mm), (2) Molsieve 5A column (SFt 2.44 m, OD ⅛, ID 2 mm), (3) PoraBOND U column (25 m, 0.32 mm, 7 μm), equipped with a thermal conductivity detector (TCD) and a flame ionization detector (FID) for analyzing $H_2$, $O_2$, diluent gas and other permanent gases, and propylene, propane, epoxypropane, acrolein, acetone, propionaldehyde, acetaldehyde, etc., wherein the positions of peaks in propylene and hydrogen gas are similar, and the mutual influence of propylene and hydrogen gas cannot be accurately distinguished, thus the gas chromatography B was used for assisting the analysis. The chromatography column of the gas chromatography B was (1) HayeSep Q column (SFt 1.83 m, OD ⅛, ID 2 mm), (2) Molsieve 5A column (SFt 2.44 m, OD ⅛, ID 2 mm), (3) HP-AL\S column (25 m, 0.32 mm, 8 μm), equipped with TCD and FID detectors for analyzing $H_2$, $O_2$, diluent gas and other permanent gases, and propylene and propane.

In the Au@TS-1 molecular sieve catalyst, the TS-1 molecular sieve was prepared by means of hydro-thermal synthesis, and the active metal Au was supported by means of deposition-precipitation.

Example 1—The Diluent Gas was Propylene

The tubular reactor was a quartz tube reactor with a diameter of 3 cm.

Combustion and Explosion Test 1) 0.3 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases were introduced into the mixer according to a ratio of $H_2:O_2:C_3H_6$:diluent gas (propylene)=24%:24%:24%:28%, the mixed gas was then fed to a preheater and preheated to 160° C., the preheated mixed gas was subsequently introduced into the reactor.

The volumetric hourly space velocity of the reaction was 4,000 mL $g_{cat}^{-1}$ $h^{-1}$, the reaction pressure of the system was controlled to be 0.2 MPa, and temperature was raised to 200° C. at a programmed temperature rise rate of 1.5° C. $min^{-1}$.

Wherein the reaction system did not explode during the reaction time of 20 min. Under the circumstance that the diluent gas was nitrogen gas, the system cannot be safely operated.

2) 0.3 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

The propylene was mixed with oxygen gas according to a ratio of 2:1 to obtain a first feed gas, the oxygen concentration was in compliance with Formula (1);

The first feed gas was mixed with hydrogen gas in a counter-flushing manner with an angle of 180° to obtain a mixed gas, wherein the ratio of hydrogen gas, oxygen gas and propylene was 1:1:2; the oxygen concentration was in compliance with Formula (1);

wherein the air inflow of propylene was composed of the amount thereof as a diluent gas and the amount thereof as a feedstock reactant gas.

The mixed gas was introduced into a preheater, and preheated to 160° C., the preheated mixed gas was subsequently fed into a reactor.

The volumetric hourly space velocity of the reaction was 4,000 mL $g_{cat}^{-1}$ $h^{-1}$, the reaction pressure of the system was controlled to be 0.2 MPa, and temperature was raised to 200° C. at a programmed temperature rise rate of 1.5° C. $min^{-1}$.

Wherein the reaction system did not explode during the reaction time of 20 min.

The other effects of the present disclosure were verified below by Examples 1-1 to 1-8 using the ratio $H_2:O_2:C_3H_6$:diluent gas=24%:24%:24%:28%.

Example 1-1

The example served to illustrate a method for direct epoxidation of propylene provided by the present disclosure.

0.20 g of Au@TS-1 molecular sieve catalyst (the loading amount of Au was 1 wt %) and 20 g of quartz sand were filled in the tubular reactor in an alternately layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 160° C., the preheated mixed gas was subsequently introduced into the tubular reactor; the volumetric hourly space velocity of the reaction was 9,000 mL $g_{cat}^{-1}$ $h^{-1}$, the reaction pressure of the system was controlled to be 0.15 MPa, and temperature was raised to 200° C. at a programmed temperature rise rate of 0.8° C. $min^{-1}$. After the reaction was stabilized for 20 minutes, an analysis on the direct epoxidation of gas phase propylene was performed, the analysis results were shown in Table 1, and an approximate time when the indicators such as propylene conversion rate and epoxypropane selectivity started to decline was recorded (the recording was performed once for every 50 hours).

Example 1-2

The example served to illustrate a method for direct epoxidation of propylene provided by the present disclosure.

0.20 g of Au@TS-1 molecular sieve catalyst (the loading amount of Au was 1 wt %) and 18 g of quartz sand were filled in the tubular reactor in an alternately layered stacking manner with respect to 10 mL of the reactor, as shown in FIG. 5C, wherein the layer height ratio of the catalyst layer and the quartz sand layer was 1:1.5, the catalyst layer and the inert filler layer were each independently 10 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 130° C., the preheated mixed gas was subsequently introduced into the tubular reactor; the volumetric hourly space velocity of the reaction was 15,000 mL $g_{cat}^{-1}$ $h^{-1}$, the reaction pressure of the system was controlled to be 0.05 MPa, and temperature was raised to 170° C. at a programmed temperature rise rate of 1.5° C. $min^{-1}$. After the reaction was stabilized for 20 minutes, an analysis on the direct epoxidation of gas phase propylene was performed, the analysis results were shown in Table 1, and an approximate time when the indicators such as propylene conversion rate and epoxypropane selectivity started to decline was recorded (the recording was performed once for every 50 hours).

Example 1-3

The example served to illustrate a method for direct epoxidation of propylene provided by the present disclosure.

0.20 g of Au@TS-1 molecular sieve catalyst (the loading amount of Au was 1 wt %) and 22 g of quartz sand were filled in the tubular reactor in an alternately layered stacking manner with respect to 10 mL of the reactor, as shown in FIG. 5C, wherein the layer height ratio of the catalyst layer and the quartz sand layer was 1:2.5, the catalyst layer and the inert filler layer were each independently 20 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; the volumetric hourly space velocity of the reaction was 2,000 mL $g_{cat}^{-1}$ $h^{-1}$, the reaction pressure of the system was controlled to be 0.25 MPa, and temperature was raised to 120° C. at a programmed temperature rise rate of 1.2° C. $min^{-1}$. After the reaction was stabilized for 20 minutes, an analysis on the direct epoxidation of gas phase propylene was performed, the analysis results were shown in Table 1, and an approximate time when the indicators such as propylene conversion rate and epoxypropane selectivity started to decline was recorded (the recording was performed once for every 50 hours).

Example 1-4

The example served to illustrate a method for direct epoxidation of propylene provided by the present disclosure.

0.20 g of Au@TS-1 molecular sieve catalyst (the loading amount of Au was 1 wt %) and 16 g of quartz sand were filled in the tubular reactor in an alternately layered stacking manner with respect to 10 mL of the reactor, as shown in FIG. 5C, wherein the layer height ratio of the catalyst layer and the quartz sand layer was 1:1, the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; the volumetric hourly space velocity of the reaction was 1,000 mL $g_{cat}^{-1}$ $h^{-1}$, the reaction pressure of the system was controlled to be 0.5 MPa, and temperature was raised to 100° C. at a programmed temperature rise rate of 0.5° C. $min^{-1}$. After the reaction was stabilized for 20 minutes, an analysis on the direct epoxidation of gas phase propylene was performed, the analysis results were shown in Table 1, and an approximate time when the indicators such as propylene conversion rate and epoxypropane selectivity started to decline was recorded (the recording was performed once for every 50 hours).

Example 1-5

The example served to illustrate a method for direct epoxidation of propylene provided by the present disclosure.

0.20 g of Au@TS-1 molecular sieve catalyst (the loading amount of Au was 1 wt %) and 30 g of quartz sand were filled in the tubular reactor in an alternately layered stacking manner with respect to 10 mL of the reactor, as shown in FIG. 5C, wherein the layer height ratio of the catalyst layer and the quartz sand layer was 1:3, the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; the volumetric hourly space velocity of the reaction was 20,000 mL $g_{cat}^{-1}$ $h^{-1}$, the reaction pressure of the system was controlled to be 0.01 MPa, and temperature was raised to 250° C. at a programmed temperature rise rate of 2.0° C. $min^{-1}$. After the reaction was stabilized for 20 minutes, an analysis on the direct epoxidation of gas phase propylene was performed, the analysis results were shown in Table 1, and an approximate time when the indicators such as propylene conversion rate and epoxypropane selectivity started to decline was recorded (the recording was performed once for every 50 hours).

Example 1-6

The example served to illustrate a method for direct epoxidation of propylene provided by the present disclosure.
The epoxypropane was prepared through direct epoxidation of propylene according to the method of Example 1-1, except that the catalyst was filled in a mode as shown in FIG. 5B. The analysis results were shown in Table 1.

Example 1-7

The example served to illustrate a method for direct epoxidation of propylene provided by the present disclosure.
The epoxypropane was prepared through direct epoxidation of propylene according to the method of Example 1-1, except that the catalyst was filled in a mode as shown in FIG. 5A. The analysis results were shown in Table 1.

Example 1-8

The example served to illustrate a method for direct epoxidation of propylene provided by the present disclosure.
The epoxypropane was prepared through direct epoxidation of propylene according to the method of Example 1-1, except that the preheating was not carried out prior to the mixed gas entered the tubular reactor unit. The analysis results were shown in Table 1.

Example 1-9

The example served to illustrate a method for direct epoxidation of propylene provided by the present disclosure.
The epoxypropane was prepared through direct epoxidation of propylene according to the method of Example 1-1, except that the ratio of $H_2:O_2:C_3H_6$:diluent gas=15%:40%:15%:30%, the reaction system was not exploded through the explosion experiment analysis, and the analysis results were shown in Table 1.

Example 1-10

The example served to illustrate a method for direct epoxidation of propylene provided by the present disclosure.
The epoxypropane was prepared through direct epoxidation of propylene according to the method of Example 1-1, except that the tubular reactor was replaced by a microchannel reactor (comprising a mixer, a preheater and a microchannel reactor, wherein each of the mixer, the preheater and the microchannel reactor had a heart-shaped structure as shown in FIG. 1, the differences resided in that an inside of the microchannel reactor was filled with the catalyst, an outer circumference of the microchannel reactor was provided with one or more temperature control devices, and an outer circumference of the preheater was disposed with one or more heating devices; wherein each of the heart-shaped structures had a length of 7 mm, the maximum width of the heart-shaped structure was 2 mm at its widest point, and a pipeline connecting two adjacent heart-shaped structures had a circular cross-section, a diameter of 1 mm, and the total length of the microchannel reactor was 1 cm); the ratio of $H_2:O_2:C_3H_6$:diluent gas=1:1:1:1. The analysis results were shown in Table 1.

Example 1-11

The example served to illustrate a method for direct epoxidation of propylene provided by the present disclosure.
The epoxypropane was prepared through direct epoxidation of propylene according to the method of Example 1-10, except that the microchannel reactor was configured as a spiral structure (shown in FIG. 4). The analysis results were shown in Table 1.

Example 1-12

The example served to illustrate a method for direct epoxidation of propylene provided by the present disclosure.
The epoxypropane was prepared through direct epoxidation of propylene according to the method of Example 1-10, except that the microchannel reactor was configured as a diamond-shaped structure (as shown in FIG. 2). The analysis results were shown in Table 1.

Example 1-13

The example served to illustrate a method for direct epoxidation of propylene provided by the present disclosure.
The epoxypropane was prepared through direct epoxidation of propylene according to the method of Example 1-1, except that the mixing of gases was performed according to the first introduction mode of the gas mixing modes and the mixed amounts specified in the "Combustion and Explosion Test", the mixed gas was then introduced into a gas preheating zone, the analysis results were shown in Table 1.

Comparative Example 1-1

The comparative example served to illustrate a method for direct epoxidation of propylene as a reference.
The epoxypropane was prepared through direct epoxidation of propylene according to the method of Example 1-1, except that the diluent gas ($C_3H_6$) was replaced by nitrogen gas, but the ratio of $H_2:O_2:C_3H_6$:diluent gas (nitrogen gas) was adjusted to 1:1:1:7 in order to ensure a safe and smooth operation of the reaction, the loading amount of the catalyst was 0.3 g. The analysis results were shown in Table 1.

Comparative Example 1-2

The comparative example served to illustrate a method for direct epoxidation of propylene as a reference.
The epoxypropane was prepared through direct epoxidation of propylene according to the method of Example 1-10, except that the microchannel reactor was not a heart-shaped structure, but a rectangular structure with a rectangular cross-section, the rectangular structure had a length of 500 μm and a width of 200 μm, the length of the entire microchannel reactor was 1 cm, the loading amount of the catalyst was 0.3 g, and the diluent gas was nitrogen gas. The analysis results were shown in Table 1.

TABLE 1

|  | Propylene conversion rate (%) | Epoxypropane selectivity (%) | Hydrogen gas utilization (%) | Service life of catalyst (h) | Space-time yield ($g_{PO}$ $kg_{cat}^{-1}$ $h^{-1}$) |
|---|---|---|---|---|---|
| Example 1-1 | 8.6 | 86.3 | 28.2 | 800 | 282.4 |
| Example 1-2 | 7.4 | 87.7 | 29.8 | 950 | 492.6 |
| Example 1-3 | 7.2 | 85.5 | 26.8 | 1200 | 47.3 |
| Example 1-4 | 5.8 | 78.5 | 20.1 | 1500 | 21.8 |
| Example 1-5 | 5.6 | 74.5 | 16.0 | 650 | 838.9 |
| Example 1-6 | 7.0 | 84.3 | 25.0 | 750 | 260.6 |
| Example 1-7 | 6.8 | 82.2 | 23.5 | 700 | 272.7 |
| Example 1-8 | 6.1 | 81.6 | 22.7 | 650 | 214.0 |
| Example 1-9 | 6.3 | 75.6 | 17.2 | 700 | 181.2 |
| Example 1-10 | 8.0 | 93.2 | 33.8 | 2100 | 349.9 |
| Example 1-11 | 7.5 | 92.1 | 32.6 | 2000 | 289.6 |
| Example 1-12 | 7.4 | 91.0 | 33.1 | 1900 | 276.6 |
| Example 1-13 | 9.2 | 87.9 | 30.7 | 1050 | 358.4 |
| Comparative Example 1-1 | 4.2 | 72.9 | 15.0 | 100 | 129.2 |
| Comparative Example 1-2 | 6.1 | 82.3 | 23.1 | 950 | 222.7 |

Note:
the conversion rate of propylene was calculated only for the propylene used as a reactant gas, and the amount of propylene used as a diluent gas was not included, i.e., when the conversion rate of propylene was calculated by analyzing the amounts of ingredients in the gas obtained after the reaction, the amount of propylene used as a diluent gas shall be subtracted therefrom, it was considered that the diluent gas did not participate the reaction.

As shown in Table 1, the diluent gas used in the present disclosure not only can reduce the used amount of the diluent gas, but also can improve propylene conversion rate, epoxypropane selectivity, the space-time yield, utilization rate of hydrogen gas, and the service life of the catalyst; when taking a tubular reactor as an example, the service life of the catalyst can be extended from the conventional 100 hours to more than 650 hours. A microchannel reactor is more advantageous in this reaction than the tubular reactor.

Although the above tests have exemplarily verified the favorable effects under a circumstance that all the diluent gas is gaseous olefin, it shall be clearly indicated that when a portion of the diluent gas is replaced by gaseous olefin, the present disclosure can still produce a better effect than the circumstance of using 100% nitrogen gas as the diluent gas.

Example 2-Alkali

Combustion and Explosion Test
1) 0.3 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases were introduced into the mixer according to a ratio of $H_2$:$O_2$:$C_3H_6$:diluent gas (propylene)=26%:26%:26%:22%, wherein ammonia gas was added into the mixer by incorporating into hydrogen gas, its final doping amount in the system was 500 ppm. The resulting mixed system was introduced into the preheater and preheated to 160° C., the preheated mixed gas was subsequently introduced into a reactor.

The volumetric hourly space velocity of the reaction was 4,000 mL $g_{cat}^{-1}$ $h^{-1}$, the reaction pressure of the system was controlled to be 0.2 MPa, and temperature was raised to 200° C. at a programmed temperature rise rate of 1.5° C. $min^{-1}$.

Wherein the reaction system did not explode during the reaction time of 20 min. Under the circumstance that the diluent gas was nitrogen gas, the system cannot be safely operated.

When an alkaline gas was not introduced and the diluent gas was nitrogen gas, the system cannot be safely operated.

The other effects of the present disclosure were verified below by Examples 2-1 to 2-9 using the ratio $H_2$:$O_2$:$C_3H_6$:diluent gas=25%:25%:25%:25%.

Example 2-1

The example served to illustrate a method for direct epoxidation of propylene provided by the present disclosure.

0.20 g of Au@TS-1 molecular sieve catalyst (the loading amount of Au was 1 wt %) and 20 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 160° C., the preheated mixed gas was subsequently introduced into the tubular reactor; wherein ammonia gas was added into the mixer by incorporating into hydrogen gas, the doping amount of ammonia gas was 800 ppm relative to the mixed gas of the reaction feed gas and the diluent gas. The volumetric hourly space velocity of the reaction was 9,000 mL $g_{cat}^{-1}$ $h^{-1}$, the reaction pressure of the system was controlled to be 0.15 MPa, and temperature was raised to 200° C. at a programmed temperature rise rate of 0.8° C. $min^{-1}$. After the reaction was stabilized for 20 minutes, an analysis on the direct epoxidation of gas phase propylene was performed, the analysis results were shown in Table 2, and an approximate time when the indicators such as propylene conversion rate and epoxypropane selectivity started to decline was recorded (the recording was performed once for every 50 hours).

Example 2-2

The example served to illustrate a method for direct epoxidation of propylene provided by the present disclosure.

0.20 g of Au@TS-1 molecular sieve catalyst (the loading amount of Au was 1 wt %) and 18 g of quartz sand were filled in the tubular reactor in a layered stacking manner with respect to 10 mL of the reactor, as shown in FIG. 5C, wherein the layer height ratio of the catalyst layer and the quartz sand layer was 1:1.5, the catalyst layer and the inert filler layer were each independently 10 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 130° C., the preheated mixed gas was subsequently introduced into the tubular reactor; wherein ammonia gas was added into the mixer by incorporating into hydrogen gas, the doping amount of ammonia gas was 500 ppm relative to the mixed gas of the reaction feed gas and the diluent gas. The volumetric hourly space velocity of the reaction was 4,000 mL $g_{cat}^{-1}$ $h^{-1}$, the reaction pressure of the system was controlled to be 0.05 MPa, and temperature was raised to 170° C. at a programmed temperature rise rate of 1.5° C. $min^{-1}$. After the reaction was stabilized for 20 minutes, an analysis on the direct epoxidation of gas phase propylene was performed, the analysis results were shown in Table 2, and an approximate time when the indicators such as propylene conversion rate and epoxypropane selectivity started to decline was recorded (the recording was performed once for every 50 hours).

Example 2-3

The example served to illustrate a method for direct epoxidation of propylene provided by the present disclosure.

0.20 g of Au@TS-1 molecular sieve catalyst (the loading amount of Au was 1 wt %) and 22 g of quartz sand were filled in the tubular reactor in a layered stacking manner with respect to 10 mL of the reactor, as shown in FIG. 5C, wherein the layer height ratio of the catalyst layer and the quartz sand layer was 1:2.5, the catalyst layer and the inert filler layer were each independently 20 layers/cm, and the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; wherein ammonia gas was added into the mixer by incorporating into hydrogen gas, the doping amount of ammonia gas was 100 ppm relative to the mixed gas of the reaction feed gas and the diluent gas. The volumetric hourly space velocity of the reaction was 13,000 mL $g_{cat}^{-1}$ $h^{-1}$, the reaction pressure of the system was controlled to be 0.25 MPa, and temperature was raised to 120° C. at a programmed temperature rise rate of 1.2° C. $min^{-1}$. After the reaction was stabilized for 20 minutes, an analysis on the direct epoxidation of gas phase propylene was performed, the analysis results were shown in Table 2, and an approximate time when the indicators such as propylene conversion rate and epoxypropane selectivity started to decline was recorded (the recording was performed once for every 50 hours).

Example 2-4

The example served to illustrate a method for direct epoxidation of propylene provided by the present disclosure.

0.20 g of Au@TS-1 molecular sieve catalyst (the loading amount of Au was 1 wt %) and 16 g of quartz sand were filled in the tubular reactor in a layered stacking manner with respect to 10 mL of the reactor, as shown in FIG. 5C, wherein the layer height ratio of the catalyst layer and the quartz sand layer was 1:1, the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; wherein pyridine was added into the mixer by incorporating into hydrogen gas, the doping amount of pyridine was 5 ppm relative to the mixed gas of the reaction feed gas and the diluent gas. The volumetric hourly space velocity of the reaction was 1,000 mL $g_{cat}^{-1}$ $h^{-1}$, the reaction pressure of the system was controlled to be 0.5 MPa, and temperature was raised to 100° C. at a programmed temperature rise rate of 0.5° C. $min^{-1}$. After the reaction was stabilized for 20 minutes, an analysis on the direct epoxidation of gas phase propylene was performed, the analysis results were shown in Table 2, and an approximate time when the indicators such as propylene conversion rate and epoxypropane selectivity started to decline was recorded (the recording was performed once for every 50 hours).

Example 2-5

The example served to illustrate a method for direct epoxidation of propylene provided by the present disclosure.

0.20 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:3, the direct epoxidation with gas phase propylene was carried out.

Wherein the feed gases $H_2$, $O_2$, $C_3H_6$ (as reactant gas) and $C_3H_6$ (as diluent gas) were introduced into a mixer and blended to form a mixed gas, which was fed into a preheater and preheated to 100° C., the preheated mixed gas was subsequently introduced into the tubular reactor; wherein ethylenediamine was added into the mixer by incorporating into hydrogen gas, the doping amount of ethylenediamine was 1,500 ppm relative to the mixed gas of the reaction feed gas and the diluent gas. The volumetric hourly space velocity of the reaction was 20,000 mL $g_{cat}^{-1}$ $h^{-1}$, the reaction pressure of the system was controlled to be 0.01 MPa, and temperature was raised to 250° C. at a programmed temperature rise rate of 2.0° C. $min^{-1}$. After the reaction was stabilized for 20 minutes, an analysis on the direct epoxidation of gas phase propylene was performed, the analysis results were shown in Table 2, and an approximate time when the indicators such as propylene conversion rate and epoxypropane selectivity started to decline was recorded (the recording was performed once for every 50 hours).

Example 2-6

The example served to illustrate a method for direct epoxidation of propylene provided by the present disclosure.

The epoxypropane was prepared through direct epoxidation of propylene according to the method of Example 2-1, except that the catalyst was filled in a mode as shown in FIG. 5B. The analysis results were shown in Table 2.

Example 2-7

The example served to illustrate a method for direct epoxidation of propylene provided by the present disclosure.

The epoxypropane was prepared through direct epoxidation of propylene according to the method of Example 2-1, except that the catalyst was filled in a mode as shown in FIG. 5A. The analysis results were shown in Table 2.

Example 2-8

The example served to illustrate a method for direct epoxidation of propylene provided by present disclosure.

The epoxypropane was prepared through direct epoxidation of propylene according to the method of Example 2-1, except that the preheating was not carried out prior to the mixed gas entered the tubular reactor unit. The analysis results were shown in Table 2.

Example 2-9

The example served to illustrate a method for direct epoxidation of propylene provided by the present disclosure.

The epoxypropane was prepared through direct epoxidation of propylene according to the method of Example 2-1, except that an equivalent amount of ethylene was used as the diluent gas. The analysis results were shown in Table 2.

Example 2-10

The example served to illustrate a method for direct epoxidation of propylene provided by the present disclosure.

The epoxypropane was prepared through direct epoxidation of propylene according to the method of Example 2-1, except that the ratio of $H_2:O_2:C_3H_6$:diluent gas=17%:42%: 17%:24%, and the reaction system was not exploded as analyzed by the explosion experiment. The analysis results were shown in Table 2.

Comparative Example 2-1

The comparative example served to illustrate a method for direct epoxidation of propylene as a reference.

The epoxypropane was prepared through direct epoxidation of propylene according to the method of Example 2-1, except that the diluent gas ($C_3H_6$) was replaced by nitrogen gas and an alkaline gas was not introduced, but the ratio of $H_2:O_2:C_3H_6$:diluent gas (nitrogen gas) was adjusted to 1:1: 1:7 in order to ensure a safe and smooth operation of the reaction, the loading amount of the catalyst was 0.3 g. The analysis results were shown in Table 2.

TABLE 2

| | Propylene conversion rate (%) | Epoxypropane selectivity (%) | Hydrogen gas utilization (%) | Service life of catalyst (h) | Space-time yield ($g_{PO}$ $kg_{cat}^{-1}$ $h^{-1}$) |
|---|---|---|---|---|---|
| Example 2-1 | 9.0 | 88.1 | 29.8 | 1100 | 344.5 |
| Example 2-2 | 8.6 | 89.6 | 31.8 | 1150 | 182.5 |
| Example 2-3 | 8.4 | 86.5 | 29.5 | 1250 | 374.9 |
| Example 2-4 | 6.2 | 79.9 | 21.2 | 1700 | 26.9 |
| Example 2-5 | 6.0 | 75.3 | 16.3 | 800 | 474.5 |
| Example 2-6 | 7.8 | 85.6 | 29.0 | 850 | 169.8 |
| Example 2-7 | 7.6 | 84.3 | 27.8 | 850 | 176.9 |
| Example 2-8 | 6.6 | 83.6 | 24.1 | 750 | 142.9 |
| Example 2-9 | 8.8 | 86.5 | 28.1 | 900 | 304.6 |
| Example 2-10 | 6.9 | 77.5 | 19.3 | 700 | 232.2 |
| Comparative Example 2-1 | 4.2 | 72.9 | 15.0 | 100 | 129.2 |

Note:
the conversion rate of propylene was calculated only for the propylene used as a reactant gas, and the amount of propylene used as a diluent gas was not included, i.e., when the conversion rate of propylene was calculated by analyzing the amounts of ingredients in the gas obtained after the reaction, the amount of propylene used as a diluent gas shall be subtracted therefrom, it was considered that the diluent gas did not participate the reaction.

As shown in Table 2, the diluent gas combined with the alkali used in the present disclosure not only can reduce the used amount of the diluent gas, but also can improve propylene conversion rate, epoxypropane selectivity, the space-time yield, utilization rate of hydrogen gas, and the service life of said catalyst.

Comparative Example 3—The Dilution Gas was Methane, Ethane or Butane

Combustion and Explosion Test 1) 0.3 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases were introduced into the mixer according to a ratio of $H_2:O_2:C_3H_6$:diluent gas=22.2%: 22.2%:22.2%:33.4% and blended to form a mixed gas, the mixed gas was fed into a preheater and preheated to 160° C., the preheated mixed gas was subsequently introduced into a reactor.

The volumetric hourly space velocity of the reaction was 4,000 mL $g_{cat}^{-1}$ $h^{-1}$, the reaction pressure of the system was controlled to be 0.2 MPa, and temperature was raised to 200° C. at a programmed temperature rise rate of 1.5° C. $min^{-1}$.

Wherein when the diluent gas was methane, ethane or butane, the reaction system did not explode during the reaction time of 20 min. Under the circumstance that the diluent gas was nitrogen gas, the system cannot be safely operated.

The other effects of the present disclosure were verified below by Comparative Examples 3-1 to 3-9 using the ratio $H_2:O_2:C_3H_6$:diluent gas=22.2%:22.2%:22.2%:33.4%.

Comparative Example 3-1

The comparative example served to illustrate a method for direct epoxidation of propylene as a reference.

0.20 g of Au@TS-1 molecular sieve catalyst (the loading amount of Au was 1 wt %) and 20 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases $H_2$, $O_2$, $C_3H_6$ and $CH_4$ were introduced into a mixer and blended to form a mixed gas, which was fed into a preheater and preheated to 160° C., the preheated mixed gas was subsequently introduced into the tubular reactor; the volumetric hourly space velocity of the reaction was 9,000 mL $g_{cat}^{-1}$ $h^{-1}$, the reaction pressure of the system was controlled to be 0.15 MPa, and temperature was raised to 200° C. at a programmed temperature rise rate of 0.8° C. $min^{-1}$. After the reaction was stabilized for 20 minutes, an analysis on the direct epoxidation of gas phase propylene was performed, the analysis results were shown in Table 3, and an approximate time when the indicators such as propylene conversion rate and epoxypropane selectivity started to decline was recorded (the recording was performed once for every 50 hours).

Comparative Example 3-2

The comparative example served to illustrate a method for direct epoxidation of propylene as a reference.

0.20 g of Au@TS-1 molecular sieve catalyst (the loading amount of Au was 1 wt %) and 18 g of quartz sand were filled in the tubular reactor in a layered stacking manner with respect to 10 mL of the reactor, as shown in FIG. 5C, wherein the layer height ratio of the catalyst layer and the quartz sand layer was 1:2.5, the catalyst layer and the inert filler layer were each independently 10 layers/cm, and the direct epoxidation with gas phase propylene was carried out.

Wherein the feed gases $H_2$, $O_2$, $C_3H_6$ and $CH_4$ were introduced into a mixer and blended to form a mixed gas, which was fed into a preheater and preheated to 130° C., the preheated mixed gas was subsequently introduced into the tubular reactor; the volumetric hourly space velocity of the reaction was 13,000 mL $g_{cat}^{-1}$ $h^{-1}$, the reaction pressure of the system was controlled to be 0.05 MPa, and temperature was raised to 150° C. at a programmed temperature rise rate of 1.5° C. $min^{-1}$. After the reaction was stabilized for 20 minutes, an analysis on the direct epoxidation of gas phase propylene was performed, the analysis results were shown in Table 3, and an approximate time when the indicators such as propylene conversion rate and epoxypropane selectivity started to decline was recorded (the recording was performed once for every 50 hours).

Comparative Example 3-3

The comparative example served to illustrate a method for direct epoxidation of propylene as a reference.

0.20 g of Au@TS-1 molecular sieve catalyst (the loading amount of Au was 1 wt %) and 22 g of quartz sand were filled in the tubular reactor in a layered stacking manner with respect to 10 mL of the reactor, as shown in FIG. 5C, wherein the layer height ratio of the catalyst layer and the quartz sand layer was 1:1.5, the catalyst layer and the inert filler layer were each independently 20 layers/cm, and the direct epoxidation with gas phase propylene was carried out.

Wherein the feed gases $H_2$, $O_2$, $C_3H_6$ and $CH_4$ were introduced into a mixer and blended to form a mixed gas, which was fed into a preheater and preheated to 100° C., the preheated mixed gas was subsequently introduced into the tubular reactor; the volumetric hourly space velocity of the reaction was 2,000 mL $g_{cat}^{-1}$ $h^{-1}$, the reaction pressure of the system was controlled to be 0.25 MPa, and temperature was raised to 120° C. at a programmed temperature rise rate of 1.2° C. $min^{-1}$. After the reaction was stabilized for 20 minutes, an analysis on the direct epoxidation of gas phase propylene was performed, the analysis results were shown in Table 3, and an approximate time when the indicators such as propylene conversion rate and epoxypropane selectivity started to decline was recorded (the recording was performed once for every 50 hours).

Comparative Example 3-4

The comparative example served to illustrate a method for direct epoxidation of propylene as a reference.

0.20 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:1, the direct epoxidation with gas phase propylene was carried out.

Wherein the feed gases $H_2$, $O_2$, $C_3H_6$ and $CH_4$ were introduced into a mixer and blended to form a mixed gas, which was fed into a preheater and preheated to 100° C., the preheated mixed gas was subsequently introduced into the tubular reactor; the volumetric hourly space velocity of the reaction was 1,000 mL $g_{cat}^{-1}$ $h^{-1}$, the reaction pressure of the system was controlled to be 0.5 MPa, and temperature was raised to 100° C. at a programmed temperature rise rate of 0.5° C. $min^{-1}$. After the reaction was stabilized for 20 minutes, an analysis on the direct epoxidation of gas phase propylene was performed, the analysis results were shown in Table 3, and an approximate time when the indicators such as propylene conversion rate and epoxypropane selectivity started to decline was recorded (the recording was performed once for every 50 hours).

Comparative Example 3-5

The comparative example served to illustrate a method for direct epoxidation of propylene as a reference.

0.20 g of Au@TS-1 molecular sieve catalyst (the loading amount of Au was 1 wt %) and 16 g of quartz sand were filled in the tubular reactor in a layered stacking manner with respect to 10 mL of the reactor, as shown in FIG. 5C, wherein the layer height ratio of the catalyst layer and the quartz sand layer was 1:3, the direct epoxidation with gas phase propylene was carried out.

Wherein the feed gases $H_2$, $O_2$, $C_3H_6$ and $CH_4$ were introduced into a mixer and blended to form a mixed gas, which was fed into a preheater and preheated to 100° C., the preheated mixed gas was subsequently introduced into the tubular reactor; the volumetric hourly space velocity of the reaction was 10,000 mL $g_{cat}^{-1}$ $h^{-1}$, the reaction pressure of the system was controlled to be 0.01 MPa, and temperature was raised to 250° C. at a programmed temperature rise rate of 2.0° C. $min^{-1}$. After the reaction was stabilized for 20 minutes, an analysis on the direct epoxidation of gas phase propylene was performed, the analysis results were shown in Table 3, and an approximate time when the indicators such as propylene conversion rate and epoxypropane selectivity started to decline was recorded (the recording was performed once for every 50 hours).

Comparative Example 3-6

The comparative example served to illustrate a method for direct epoxidation of propylene as a reference.

The epoxypropane was prepared through direct epoxidation of propylene according to the method of Comparative Example 3-1, except that the catalyst was filled in a mode as shown in FIG. 5B. The analysis results were shown in Table 3.

Comparative Example 3-7

The comparative example served to illustrate a method for direct epoxidation of propylene as a reference.

The epoxypropane was prepared through direct epoxidation of propylene according to the method of Comparative Example 3-1, except that the catalyst was filled in a mode as shown in FIG. 5A. The analysis results were shown in Table 3.

Comparative Example 3-8

The comparative example served to illustrate a method for direct epoxidation of propylene as a reference.

The epoxypropane was prepared through direct epoxidation of propylene according to the method of Comparative Example 3-1, except that the preheating was not carried out prior to the mixed gas entered the tubular reactor unit. The analysis results were shown in Table 3.

Comparative Examples 3-9

The comparative example served to illustrate a method for direct epoxidation of propylene as a reference.

The epoxypropane was prepared through direct epoxidation of propylene according to the method of Example 3-1, except that an equivalent amount of ethane was used as the diluent gas. The analysis results were shown in Table 3.

TABLE 3

|  | Propylene conversion rate (%) | Epoxypropane selectivity (%) | Hydrogen gas utilization (%) | Service life of catalyst (h) | Space-time yield ($g_{PO}$ $kg_{cat}^{-1}$ $h^{-1}$) |
| --- | --- | --- | --- | --- | --- |
| Comparative Example 3-1 | 7.0 | 85.2 | 26.5 | 800 | 244.3 |
| Comparative Example 3-2 | 6.6 | 86.2 | 28.0 | 850 | 335.0 |
| Comparative Example 3-3 | 6.2 | 84.2 | 25.3 | 900 | 39.6 |
| Comparative Example 3-4 | 5.2 | 76.3 | 19.5 | 1100 | 18.9 |
| Comparative Example 3-5 | 5.0 | 70.1 | 11.1 | 500 | 346.7 |
| Comparative Example 3-6 | 5.7 | 83.0 | 23.5 | 700 | 251.1 |
| Comparative Example 3-7 | 5.2 | 79.1 | 21.0 | 600 | 266.4 |
| Comparative Example 3-8 | 5.4 | 80.3 | 21.5 | 550 | 209.4 |
| Comparative Example 3-9 | 7.1 | 85.3 | 26.2 | 800 | 281.8 |

Comparative Example 4—The Dilute Gas was Propane

The tubular reactor was a quartz tube reactor with a diameter of 3 cm.

Combustion and Explosion Test 1) 0.3 g of Au@TS-1 molecular sieve catalyst (the loading amount of Au was 1 wt %) and 30 g of quartz sand were filled in a microchannel reactor or a tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases were introduced into the mixer according to a ratio of $H_2:O_2:C_3H_6$:propane=23%:23%:23%:31% and blended to form a mixed gas, the mixed gas was fed into the preheater and preheated to 160° C., the preheated mixed gas was subsequently introduced into the reactor.

The volumetric hourly space velocity of the reaction was 4,000 mL $g_{cat}^{-1}$ $h^{-1}$, the reaction pressure of the system was controlled to be 0.2 MPa, and temperature was raised to 200° C. at a programmed temperature rise rate of 1.5° C. $min^{-1}$.

Wherein the reaction system did not explode during the reaction time of 20 minutes.

In the tubular reactors, the system cannot be safely operated when the diluent gas was replaced by nitrogen gas.

The other effects of the present disclosure were verified by Comparative Examples 4-1 to 4-8 below using the ratio $H_2:O_2:C_3H_6$:diluent gas=23%:23%:23%:31%.

Comparative Example 4-1

The comparative example served to illustrate a method for direct epoxidation of propylene as a reference.

0.20 g of Au@TS-1 molecular sieve catalyst (the loading amount of Au was 1 wt %) and 20 g of quartz sand were filled in the tubular reactor in a layered stacking manner with respect to 10 mL of the reactor, as shown in FIG. 5C, wherein the layer height ratio of the catalyst layer and the quartz sand layer was 1:2, the catalyst layer and the inert filler layer were each independently 15 layers/cm, and the direct epoxidation with gas phase propylene was carried out.

Wherein the feed gases $H_2$, $O_2$, $C_3H_6$ and propane were introduced into a mixer and blended to form a mixed gas, which was fed into a preheater and preheated to 160° C., the preheated mixed gas was subsequently introduced into the tubular reactor; the volumetric hourly space velocity of the reaction was 9,000 mL $g_{cat}^{-1}$ $h^{-1}$, the reaction pressure of the system was controlled to be 0.15 MPa, and temperature was raised to 200° C. at a programmed temperature rise rate of 0.8° C. $min^{-1}$. After the reaction was stabilized for 20 minutes, an analysis on the direct epoxidation of gas phase propylene was performed, the analysis results were shown in Table 4, and an approximate time when the indicators such as propylene conversion rate and epoxypropane selectivity started to decline was recorded (the recording was performed once for every 50 hours).

Comparative Example 4-2

The comparative example served to illustrate a method for direct epoxidation of propylene as a reference.

0.20 g of Au@TS-1 molecular sieve catalyst (the loading amount of Au was 1 wt %) and 18 g of quartz sand were filled in the tubular reactor in a layered stacking manner with respect to 10 mL of the reactor, as shown in FIG. 5C, wherein the layer height ratio of the catalyst layer and the quartz sand layer was 1:1.5, the catalyst layer and the inert filler layer were each independently 10 layers/cm, and the direct epoxidation with gas phase propylene was carried out.

Wherein the feed gases $H_2$, $O_2$, $C_3H_6$ and propane were introduced into a mixer and blended to form a mixed gas, which was fed into a preheater and preheated to 130° C., the preheated mixed gas was subsequently introduced into the tubular reactor; the volumetric hourly space velocity of the reaction was 15,000 mL $g_{cat}^{-1}$ $h^{-1}$, the reaction pressure of the system was controlled to be 0.05 MPa, and temperature was raised to 170° C. at a programmed temperature rise rate of 1.5° C. $min^{-1}$. After the reaction was stabilized for 20 minutes, an analysis on the direct epoxidation of gas phase propylene was performed, the analysis results were shown in Table 4, and an approximate time when the indicators such as propylene conversion rate and epoxypropane selectivity started to decline was recorded (the recording was performed once for every 50 hours).

Comparative Example 4-3

The comparative example served to illustrate a method for direct epoxidation of propylene as a reference.

0.20 g of Au@TS-1 molecular sieve catalyst (the loading amount of Au was 1 wt %) and 22 g of quartz sand were filled in the tubular reactor in a layered stacking manner with respect to 10 mL of the reactor, as shown in FIG. 5C, wherein the layer height ratio of the catalyst layer and the quartz sand layer was 1:2.5, the catalyst layer and the inert filler layer were each independently 20 layers/cm, and the direct epoxidation with gas phase propylene was carried out.

Wherein the feed gases $H_2$, $O_2$, $C_3H_6$ and propane were introduced into a mixer and blended to form a mixed gas, which was fed into a preheater and preheated to 100° C., the preheated mixed gas was subsequently introduced into the tubular reactor; the volumetric hourly space velocity of the reaction was 2,000 mL $g_{cat}^{-1}$ $h^{-1}$, the reaction pressure of the system was controlled to be 0.25 MPa, and temperature was raised to 120° C. at a programmed temperature rise rate of 1.2° C. min$^{-1}$. After the reaction was stabilized for 20 minutes, an analysis on the direct epoxidation of gas phase propylene was performed, the analysis results were shown in Table 4, and an approximate time when the indicators such as propylene conversion rate and epoxypropane selectivity started to decline was recorded (the recording was performed once for every 50 hours).

Comparative Example 4-4

The comparative example served to illustrate a method for direct epoxidation of propylene as a reference.

0.20 g of Au@TS-1 molecular sieve catalyst (the loading amount of Au was 1 wt %) and 16 g of quartz sand were filled in the tubular reactor in a layered stacking manner with respect to 10 mL of the reactor, as shown in FIG. 5C, wherein the layer height ratio of the catalyst layer and the quartz sand layer was 1:1, the direct epoxidation with gas phase propylene was carried out.

Wherein the feed gases $H_2$, $O_2$, $C_3H_6$ and propane were introduced into a mixer and blended to form a mixed gas, which was fed into a preheater and preheated to 100° C., the preheated mixed gas was subsequently introduced into the tubular reactor; the volumetric hourly space velocity of the reaction was 1,000 mL $g_{cat}^{-1}$ h$^{-1}$, the reaction pressure of the system was controlled to be 0.5 MPa, and temperature was raised to 100° C. at a programmed temperature rise rate of 0.5° C. min$^{-1}$. After the reaction was stabilized for 20 minutes, an analysis on the direct epoxidation of gas phase propylene was performed, the analysis results were shown in Table 4, and an approximate time when the indicators such as propylene conversion rate and epoxypropane selectivity started to decline was recorded (the recording was performed once for every 50 hours).

Comparative Example 4-5

The comparative example served to illustrate a method for direct epoxidation of propylene as a reference.

0.20 g of Au@TS-1 molecular sieve catalyst (the loading amount of Au was 1 wt %) and 30 g of quartz sand were filled in the tubular reactor in a layered stacking manner with respect to 10 mL of the reactor, as shown in FIG. 5C, wherein the layer height ratio of the catalyst layer and the quartz sand layer was 1:3, the direct epoxidation with gas phase propylene was carried out.

Wherein the feed gases $H_2$, $O_2$, $C_3H_6$ and propane were introduced into a mixer and blended to form a mixed gas, which was fed into a preheater and preheated to 100° C., the preheated mixed gas was subsequently introduced into the tubular reactor; the volumetric hourly space velocity of the reaction was 25,000 mL $g_{cat}^{-1}$ h$^{-1}$, the reaction pressure of the system was controlled to be 0.01 MPa, and temperature was raised to 250° C. at a programmed temperature rise rate of 2.0° C. min$^{-1}$. After the reaction was stabilized for 20 minutes, an analysis on the direct epoxidation of gas phase propylene was performed, the analysis results were shown in Table 4, and an approximate time when the indicators such as propylene conversion rate and epoxypropane selectivity started to decline was recorded (the recording was performed once for every 50 hours).

Comparative Example 4-6

The comparative example served to illustrate a method for direct epoxidation of propylene as a reference.

The epoxypropane was prepared through direct epoxidation of propylene according to the method of Comparative Example 4-1, except that the catalyst was filled in a mode as shown in FIG. 5B. The analysis results were shown in Table 4.

Comparative Example 4-7

The comparative example served to illustrate a method for direct epoxidation of propylene as a reference.

The epoxypropane was prepared through direct epoxidation of propylene according to the method of Comparative Example 4-1, except that the catalyst was filled in a mode as shown in FIG. 5B. The analysis results were shown in Table 4.

Comparative Example 4-8

The comparative example served to illustrate a method for direct epoxidation of propylene as a reference.

The epoxypropane was prepared through direct epoxidation of propylene according to the method of Comparative Example 4-1, except that the preheating was not carried out prior to the mixed gas entered the tubular reactor unit. The analysis results were shown in Table 4.

TABLE 4

| | Propylene conversion rate (%) | Epoxypropane selectivity (%) | Hydrogen gas utilization (%) | Service life of catalyst (h) | Space-time yield ($g_{PO}$ $kg_{cat}^{-1}$ h$^{-1}$) |
|---|---|---|---|---|---|
| Comparative Example 4-1 | 7.6 | 85.6 | 26.9 | 800 | 259.0 |
| Comparative Example 4-2 | 6.9 | 87.1 | 28.5 | 900 | 454.4 |
| Comparative Example 4-3 | 6.6 | 85.1 | 26.2 | 1000 | 42.0 |
| Comparative Example 4-4 | 5.5 | 77.2 | 19.7 | 1200 | 19.6 |
| Comparative Example 4-5 | 5.2 | 70.8 | 11.6 | 600 | 928.3 |
| Comparative Example 4-6 | 6.2 | 83.8 | 24.4 | 700 | 245.9 |
| Comparative Example 4-7 | 6.0 | 81.9 | 21.5 | 650 | 231.9 |
| Comparative Example 4-8 | 5.7 | 81.1 | 22.2 | 650 | 193.9 |

As can be seen from Table 1, Table 3 and Table 4, the use of the gaseous olefin of the present disclosure as a diluent gas is advantageous over gaseous alkane.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of performing direct epoxidation of propylene comprising:
   contacting a mixed gas consisting of a reaction feed gas and a diluent gas with a catalyst to carry out propylene epoxidation to produce epoxypropane,
   wherein the reaction feed gas comprises propylene, oxygen gas and hydrogen gas,
   at least a portion of the diluent gas is a gaseous olefin selected from $C_2$-$C_4$ olefins and mixtures thereof, and
   a proportion of oxygen gas in the mixed gas is more than 14 vol. %.

2. The method of claim 1, wherein the proportion of the diluent gas in the mixed gas is less than 60 vol. %.

3. The method of claim 1 wherein the propylene epoxidation is carried out in the presence of an alkali, which is an alkaline gas, or an alkaline substance that is gaseous under the reaction conditions.

4. The method of claim 3, wherein the alkali is a compound having a lone pair of electrons and/or a substance capable of accepting protons;
   wherein, the compound having a lone electron pair is at least one selected from the group consisting of ammonia, pyridine, hydrazine, cyanogen, amine, alcohol, ether and thiol; and/or
   the substance capable of accepting protons is at least one selected from the group consisting of $Cl^-$, $[Al(H_2O)_5OH]^{2+}$, $Ac^-$, $HPO_4^{2-}$ and $PO_4^{3-}$.

5. The method of claim 3, wherein the alkali is used in the mixed gas in an amount of 1-10,000 ppm.

6. The method of claim 3, wherein the diluent gas is propylene.

7. The method of claim 6, wherein the proportion of oxygen gas in the mixed gas is more than 16 vol. %.

8. The method of claim 6, wherein the proportion of the diluent gas in the mixed gas is less than 57.5 vol. %.

9. The method of claim 1, wherein the propylene epoxidation is carried out in a tubular reactor or a microchannel reactor.

10. The method of claim 9, wherein one or more flow perturbing members are disposed in the microchannel reactor;
    wherein the flow perturbing member has a shape selected from the group consisting of heart, diamond, S-shape, triangle, rectangle, square, circle, crossed finger type, spiral, V-shape, T-shape and C-shape;
    alternatively, the microchannel reactor is a spiral microchannel reactor.

11. The method of claim 1, wherein the catalyst is a supported metal catalyst comprising a carrier and an active metal component; the active metal component is at least one selected from the group consisting of gold, silver, copper, ruthenium, palladium, platinum, rhodium, cobalt, nickel, tungsten, bismuth, molybdenum and oxides thereof; the carrier is at least one selected from the group consisting of carbon black, activated carbon, silica, alumina, ceria and zeolite; the content of the active metal component in terms of the metal element in the catalyst is 0.01-50 wt %, based on the total weight of the catalyst.

12. The method of claim 1, wherein the catalyst is filled in the reactor in a form of combining with an inert filler;
    wherein, the inert filler is at least one selected from the group consisting of silica sand, $Al_2O_3$, porous silica gel and ceramic ring;
    wherein, the inert filler is used in an amount of 1-200 parts by weight with respect to 1 part by weight of the catalyst;
    wherein, the catalyst and the inert filler are filled in the reactor in a layered stacking manner.

13. The method of claim 1, wherein the reaction conditions of propylene epoxidation comprise: a reaction temperature of 20-300° C.; a reaction pressure of 0-5 MPa; and a volumetric hourly space velocity of 500-30,000 mL $g_{cat}^{-1}$ $h^{-1}$.

14. The method of claim 1, wherein the method further comprises a step of preheating the mixed gas prior to contacting the mixed gas with the catalyst.

15. The method of claim 1, wherein the propylene epoxidation is performed in the absence of a solvent.

16. The method of claim 1, wherein the method further comprises:
    blending a first feed gas and a second feed gas to obtain the mixed gas;
    wherein the first feed gas comprises oxygen gas, the second feed gas comprises hydrogen gas, the first feed gas and/or the second feed gas contain propylene, at least one of the first feed gas and the second feed gas further comprises a gaseous olefin.

17. The method of claim 16, wherein the concentration of oxygen gas in the first feed gas and the mixed gas each independently satisfies the following form $$X_{O2} \leq 1 - \frac{1}{\sum \frac{X_n}{N_n} + \frac{X_{propylene}}{N_{propylene}} + \frac{X_{hydrogen}}{N_{hydrogen}}}, \text{ or} \quad \text{Formula (1)}$$

$$X_{O2} \geq 1 - \frac{1}{\sum \frac{X_n}{L_n} + \frac{X_{propylene}}{L_{propylene}} + \frac{X_{hydrogen}}{L_{hydrogen}}}; \quad \text{Formula (2)}$$

wherein,
$X_{O2}$ denotes the volume fraction (%) of oxygen gas in the mixed gas;
$X_n$ denotes the volume fraction (%) of the gaseous olefin n in the mixed gas;
$X_{propylene}$ denotes the volume fraction (%) of propylene in the mixed gas;
$X_{hydrogen}$ denotes the volume fraction (%) of hydrogen gas in the mixed gas;
$N_n$ denotes the lower explosion limit (%) of the gaseous olefin n in the mixed gas;
$N_{propylene}$ denotes the lower explosion limit (%) of propylene in the mixed gas;
$N_{hydrogen}$ denotes the lower explosion limit (%) of hydrogen gas in the mixed gas;
$L_n$ denotes the upper explosion limit (%) of the gaseous olefin n in the mixed gas;
$L_{propylene}$ denotes the upper explosion limit (%) of propylene in the mixed gas;
$L_{hydrogen}$ denotes the upper explosion limit (%) of hydrogen gas in the mixed gas.

18. The method of claim 12, wherein the catalyst and the inert filler are filled in the reactor in an alternately layered stacking manner; wherein, the layer height ratio of each layer of the catalyst and each layer of the inert filler is 1:1-10.

* * * * *